United States Patent [19]

Yanagi

[11] Patent Number: 5,499,230
[45] Date of Patent: Mar. 12, 1996

[54] OPTICAL DISK APPARATUS

[75] Inventor: Shigenori Yanagi, Kawasaki, Japan

[73] Assignee: Fujitsu Limited, Kawasaki, Japan

[21] Appl. No.: 324,626

[22] Filed: Oct. 17, 1994

[30] Foreign Application Priority Data

Jan. 10, 1994 [JP] Japan .................................. 6-000723

[51] Int. Cl.$^6$ ...................................................... G11B 7/00
[52] U.S. Cl. .......................... 369/124; 369/54; 369/44.11; 369/44.41; 369/110; 369/44.32
[58] Field of Search ..................................... 369/124, 120, 369/116, 105, 110, 109, 100, 99, 44.32, 44.34, 44.36, 44.41, 44.42, 48, 54, 58, 44.11

[56]         References Cited

U.S. PATENT DOCUMENTS

| | | | |
|---|---|---|---|
| 4,835,759 | 5/1989 | Saito et al. ................................... | 369/48 |
| 5,103,440 | 4/1992 | Yamamura ................................. | 369/54 |
| 5,109,367 | 4/1992 | Yoshikawa ................................. | 369/54 |
| 5,181,195 | 1/1993 | Kume et al. ........................... | 369/44.41 |
| 5,199,012 | 3/1993 | Imai ...................................... | 369/44.41 |
| 5,247,501 | 9/1993 | Hashimoto et al. .................... | 369/44.11 |
| 5,251,196 | 10/1993 | Morimoto et al. ........................ | 369/110 |
| 5,404,344 | 4/1995 | Imada et al. .............................. | 369/110 |
| 5,416,764 | 5/1995 | Chikazawa et al. ..................... | 369/124 |

FOREIGN PATENT DOCUMENTS

| | | |
|---|---|---|
| 59-094249 | 5/1984 | Japan . |
| 63-181134 | 7/1988 | Japan . |
| 64-001131 | 1/1989 | Japan . |
| 1-179230 | 7/1989 | Japan . |

Primary Examiner—Loha Ben
Attorney, Agent, or Firm—Greer, Burns & Crain, Ltd.

[57]         ABSTRACT

Signals from two light receiving sections of a 2-split photodetector are separated to the AC coupled high frequency side and the DC coupled low frequency side. Both signals are added, thereby forming a tracking error signal of a wide band. A tracking error signal is independently formed with respect to the high frequency side and can be also added to the signal on the low frequency side.

22 Claims, 13 Drawing Sheets

OPTICAL DISK APPARATUS

BACKGROUND OF THE INVENTION

The present invention relates to an optical disk apparatus for reading and writing data from/to an optical disk and, more particularly, to an optical disk apparatus for producing a read signal and a servo error signal having different frequency bands from a detection signal of a same photodetector.

Hitherto, in an optical disk apparatus using a rewritable optical disk medium, both of a reproduction signal to demodulate data and aservo error signal which is used for servo control are produced from a return light of a read beam reflected and diffracted by the optical disk by photoelectric conversion. There are a focusing error signal and a tracking error signal in the servo error signal. The tracking error signal is used for counting the number of tracks at the time of seeking. Upon seeking, the value of the track count is subtracted from the number of tracks up to the target track, thereby obtaining the remaining number of tracks. A target speed corresponding to the remaining number of tracks is generated and an optical head is speed controlled (coarse control) in accordance with the order of acceleration, constant speed, and deceleration. When the remaining number of tracks is equal to 0 during the deceleration, the control mode is switched from a speed control to an on-track control (fine control) and the head is led to the track, thereby accurately seeking to the target track.

Generally, the tracking error signal is detected by a push-pull method (far field method). That is, an image of the primary diffraction light generated by the irradiation of a read beam to the track of a preformat shape sandwitched by grooves on the both sides is formed on a 2-split type photodetector. By obtaining a difference between the light reception signals of two light receiving sections, the tracking error signal is formed.

FIG. 1 shows a reproducing circuit of the reproduction signal and the tracking error signal in a conventional optical disk apparatus together with a read optical system. A laser beam from a laser diode 170 is wavefront converted by a collimating lens 172 and is transmitted through a beam splitter 174 which functions as a half mirror and is formed as an image onto the medium surface of an optical disk 130 by an objective lens 176. The return light as a primary diffraction light by the track shape of the medium surface is reflected by the beam splitter 174. A (P) polarization component transmitted through a polarization beam splitter 178 is formed as an image on a 2-split photodetector 182. An (S) polarization component reflected by the polarization beam splitter 178 is formed as an image on a photodetector 180 to detect a reflection intensity.

Light receiving sections 184 and 186 provided for the 2-split photodetector 182 generate detection currents $i_1$ and $i_2$ corresponding to the intensity of the return light. The detection currents $i_1$ and $i_2$ are amplified by operational amplifiers 220 and 228 which are DC coupled and are converted into the voltage signals. After that, the voltage signals are differentially amplified by an operational amplifier 370. An output voltage of the operational amplifier 370 is a voltage that is proportional to the difference $(i_1-i_2)$ between the detection currents $i_1$ and $i_2$ and is generated as a tracking error signal TES.

On the other hand, a reproduction signal MO is formed by operational amplifiers 208, 364 and 214. That is, detection currents from the light receiving sections 184 and 186 of the 2-split photodetector 182 are added by AC coupling by capacitors 188 and 196 and the added current is amplified by the operational amplifier 364 and is converted to the voltage signal. On the other hand, a detection current $i_0$ of the photodetector 180 is also AC coupled to the operational amplifier 208 by a capacitor 206 and is converted to a voltage signal by amplifying. Signal voltages from the operational amplifiers 208 and 364 are AC coupled to the operational amplifier 214 by capacitors 210 and 366 and a difference between them is obtained and is generated as a reproduction signal MO. The MO signal is a signal that is proportional to:

$$i_0-(i_1+i_2)$$

Further, as a light intensity signal ID indicative of a light intensity by the preformat shaped concave and convex portions of the track, a signal which is proportional to:

$$i_0+(i_1+i_2)$$

is obtained by an adding circuit (not shown).

Recently, in association with a high-speed seeking operation of the optical disk apparatus, a frequency of the tracking error signal TES is equal to or higher than 500 kHz in correspondence to the maximum speed of the head during the seeking operation, so that a frequency band of at least DC to 500 kHz is required. On the other hand, a frequency band of the reproduction signal MO for demodulation of data lies within a range from 10 kHz to 20 MHz. In this instance, as shown in FIG. 1, when the photodetector to detect the return light is commonly used for both of the reproduction signal and the servo signal, the frequency bands which are necessary by them overlap, so that the signals having the frequency bands necessary for both signals cannot be separated by a simple band separating filter comprising a resistor and a capacitor.

As shown in FIG. 2, the photodetector for the reproduction signal and the photodetector for servo are separately provided and the return light is separated and is independently converted to the electric signal. That is, a part of the return light separated by the beam splitter 174 is reflected by a beam splitter 348 and is formed as an image on the 2-split photodetector 182 only for use in the servo. The (P) polarization component of the remaining return light which has transmitted through the beam splitter 348 is transmitted by a polarization beam splitter 380 and is formed as an image onto a photodetector 382. The (S) polarization component is reflected and is formed as an image onto the photodetector 180.

As for the 2-split photodetector 182 for use in only the servo, the tracking error signal TES of a frequency band of DC to 500 kHz is formed by the operational amplifiers 220, 228, 370 in a manner similar to FIG. 1. On the other hand, with respect to the photodetectors 180 and 382 for reproduction, the signals from those photodetectors are amplified and converted into the voltage signals by the AC coupling by the amplifiers 208 and 386. After that, the voltage signals are differential amplified by an operational amplifier 394, thereby forming the reproduction signal MO having a frequency band of 10 kHz to 20 MHz that is proportional to $(i_{01}-i_{02})$.

However, in the case where the photodetectors are separately provided for servo and reproduction as shown in FIG. 2, the optical system is complicated, resulting in an obstacle for miniaturization of the optical head. Since the optical parts such as a beam splitter using a prism which functions as a half mirror and the like are super high precision parts on the order of angstrom, they are obstacles in decrease in costs. Further, in recent years, due to an increase in recording density of the optical disk medium, the quality (S/N ratio) of the reproduction signal is becoming significant. In this case, when a quantity of light is decreased by the beam splitter 348 newly added, noises of the photodetectors and amplifiers are dominant, so that the reliability is deteriorated.

Therefore, as shown FIG. 1, it is desirable that the photodetector is commonly used for servo and reproduction without increasing the number of beam splitters. In this case, in order to cope with the realization of a wide band, it is considered that, after the return light was converted into the electric signal, the electric signal is transmitted through an operational amplifier having very wide frequency characteristics of DC to 20 MHz, and after that, the reproduction signal and servo error signal are electrically formed. Namely, as shown in FIG. 3, the detection currents $i_1$ and $i_2$ from the 2-split photodetector 182 are first amplified by operational amplifiers 378 and 384 having very wide frequency characteristics of DC to 20 MHz, thereby converting into the voltage signals. The other constructions are substantially the same as those in FIG. 1. As operational amplifiers 378 and 384 for the above processes, high speed operational amplifiers each having a high through rate are necessary, so that the costs remarkably rise. For example, the costs of the high-speed operational amplifier are several times as high as those of the general operational amplifier. There are problems such that an electric power consumption of the high speed operational amplifier is large and a size of package thereof is also large.

SUMMARY OF THE INVENTION

According to the invention, there is provided an economical optical disk apparatus in which, in the case where photodetectors for demodulation of a servo signal and for demodulation of data are commonly used, a general operational amplifier is used as it is and which can cope with the realization of a wide band of a tracking error signal in association with the high seeking speed.

A read optical unit irradiates a read beam onto an optical disk and extracts the return light reflected and diffracted by a track portion of the optical disk and converts the return light into the electric signals by a photodetector having at least two-split light receiving section.

As for the reproduction side for demodulation of data, a first circuit is provided. The first circuit AC couples the detection signals from the two light receiving sections provided for the photodetector and simultaneously separates the band on the high frequency side and individually amplifies in a frequency band (10 kHz to 20 MHz) from a predetermined first cut-off frequency (10 kHz or higher) to an ultra high frequency (20 MHz or lower). After that, the amplified signals are added, thereby forming the high frequency reproduction signal MO which is used for reproducing a read signal.

On the other hand, with respect to the demodulation side of a servo signal, a second circuit is provided. The second circuit DC couples the detection signals from the two light receiving sections of the photodetector and individually amplifies in a frequency band (DC to 10 kHz) from a direct current component DC to the first cut-off frequency (10 kHz or lower). Subsequently, the detection signals (frequency band from 10 kHz to 20 MHz) which were individually amplified in the first circuit are added, thereby forming an addition signal having a frequency band from the direct current component DC to a second high cut-off frequency 500 kHz. Finally, a subtraction is performed between the two addition signals, thereby forming the tracking error signal TES.

In this instance, the read optical unit comprises at least a beam splitter for separating the return light of the optical disk medium from an emission beam and at least one polarization beam splitter for separating the return light separated by the beam splitter into the transmission light of the (P) polarization and the reflection light of the (S) polarization reflected in the direction of 45° or more. The transmission light of the polarization beam splitter is allowed to enter the photodetector.

The first and second circuits have current voltage converting circuits for converting the detection currents $i_1$ and $i_2$ generated from the photodetector into the voltage signals. An addition gain in the second circuit is set to almost one time. Further, a binarizing circuit for slicing the tracking error signal output from the second circuit by an almost center voltage, thereby binarizing, and a track counter circuit for counting a binary signal from the binarizing circuit at the time of the seeking operation.

In the optical disk apparatus of the invention, thus, it is unnecessary to use an operational amplifier of a wide band in a circuit for forming a tracking error signal and the tracking error signal TES of a wide band from DC to 500 kHz can be formed by adding a high frequency component of the signal formed by a reproducing circuit for demodulation data. By commonly using the 2-split photodetector for reproduction and for servo, the optical system can be simplified and miniaturized.

As a modification of the invention, since the realization of a wide band of the tracking error signal at the time of fine control is not required as compared with the request to realize a wide band of the tracking error signal in the seeking operation, two kinds of tracking error signals TES1 and TES2 having different frequency bands are formed. Namely, in the second circuit, the detection signals from the two light receiving sections provided for the photodetector are DC coupled and individually amplified in a frequency band from the DC component to a frequency that is equal to or lower than the first cut-off frequency 10 kHz. After that, a subtraction between the two detection signals is performed, thereby forming the first tracking error signal TES1. The first tracking error signal TES1 generated from the second circuit is used in only the fine control for allowing the light beam to trace a target track.

On the other hand, after a differential signal was formed from the two detection signals obtained by the first circuit, the second tracking error signal TES2 having a frequency band of DC to 500 kHz is formed by adding the first tracking error signal TES1 from the second circuit by a third circuit. The second tracking error signal TES2 generated from the third circuit is used only for counting the number of tracks at the time of seeking operation.

As mentioned above, from the difference of the high frequency detection signals of 10 kHz to 20 MHz which are formed on the reproducing circuit side for data demodulation, the tracking error signal is separately formed and is added to the tracking error signal of the low frequency component of about DC to 10 kHz, thereby forming the tracking error signal having a band of DC to 500 kHz which is used for the track counting. The tracking error signal of the low frequency in this case is used only for the fine control. On the other hand, since the light emission powers of the detection currents of the optical disk at the time of the fine control in the writing, erasing, and reading modes differ, the powers of the return lights also differ. Therefore, a normalizing circuit for dividing the difference $(i_1-i_2)$ between the two detection signals of the photodetector by the sum $(i_1+i_2)$ of the two detection signals and generating the first tracking error signal TES1 normalized as $$(i_1-i_2)/(i_1+i_2)$$

is provided for the second circuit. In order to enable the normalizing circuit to be driven by a single power source and to be formed as an IC, it is constructed as follows. First, two sets of a pair of transistors whose emitters are commonly connected are provided.

A specific DC bias voltage is applied to a base of the transistor of one of each transistor pair, collectors are commonly connected through a resistor and are connected to a power source, and a base of the other transistor of each transistor pair is commonly connected, thereby forming a dividing circuit. A difference between a current that is equal to a current of the common connecting section and a reference current is integrated by a capacitor and is applied to the bases of the other transistors connected commonly. Further, a pair of light receiving sections are connected to the common emitters of the transistor pairs so that the detection currents of the pair of light receiving sections of the photodetector flow, thereby obtaining the first servo error signal TES1 from each collector potential of one transistor. By normalizing the tracking error signal TES1 of the low frequency as mentioned above, it is not influenced by a change in light power in the reading, erasing, or writing mode.

The above and other objects, features, and advantages of the present invention will become more apparent from the following detailed description with reference to the drawings.

DETAILED DESCRIPTION OF THE PREFERRED EMBODIMENT

[Hardware construction]

Figure 1:
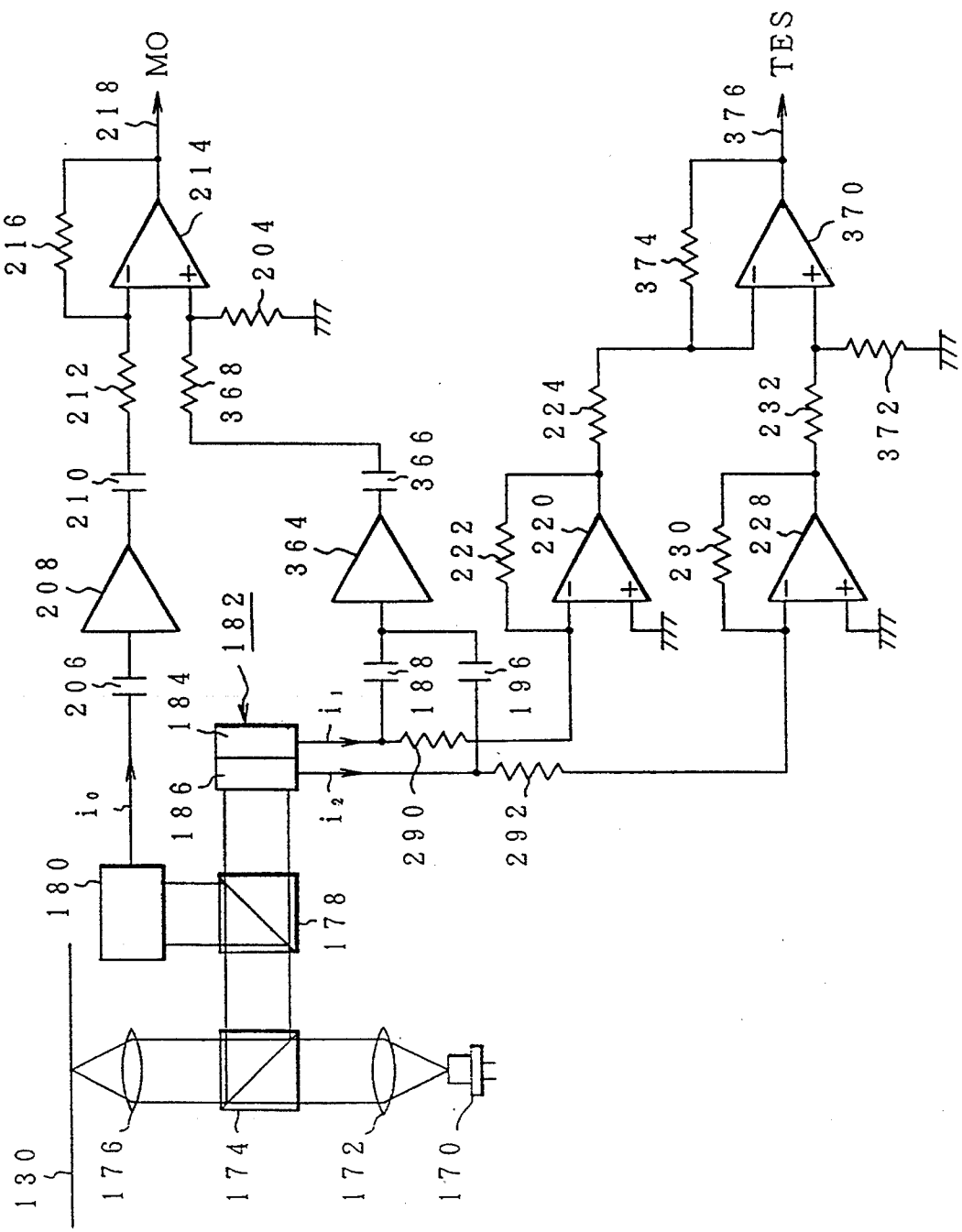
FIG. 1 is a block diagram of a conventional circuit n which a photodetector is commonly used for data demodulation and for servo.
Figure 2:
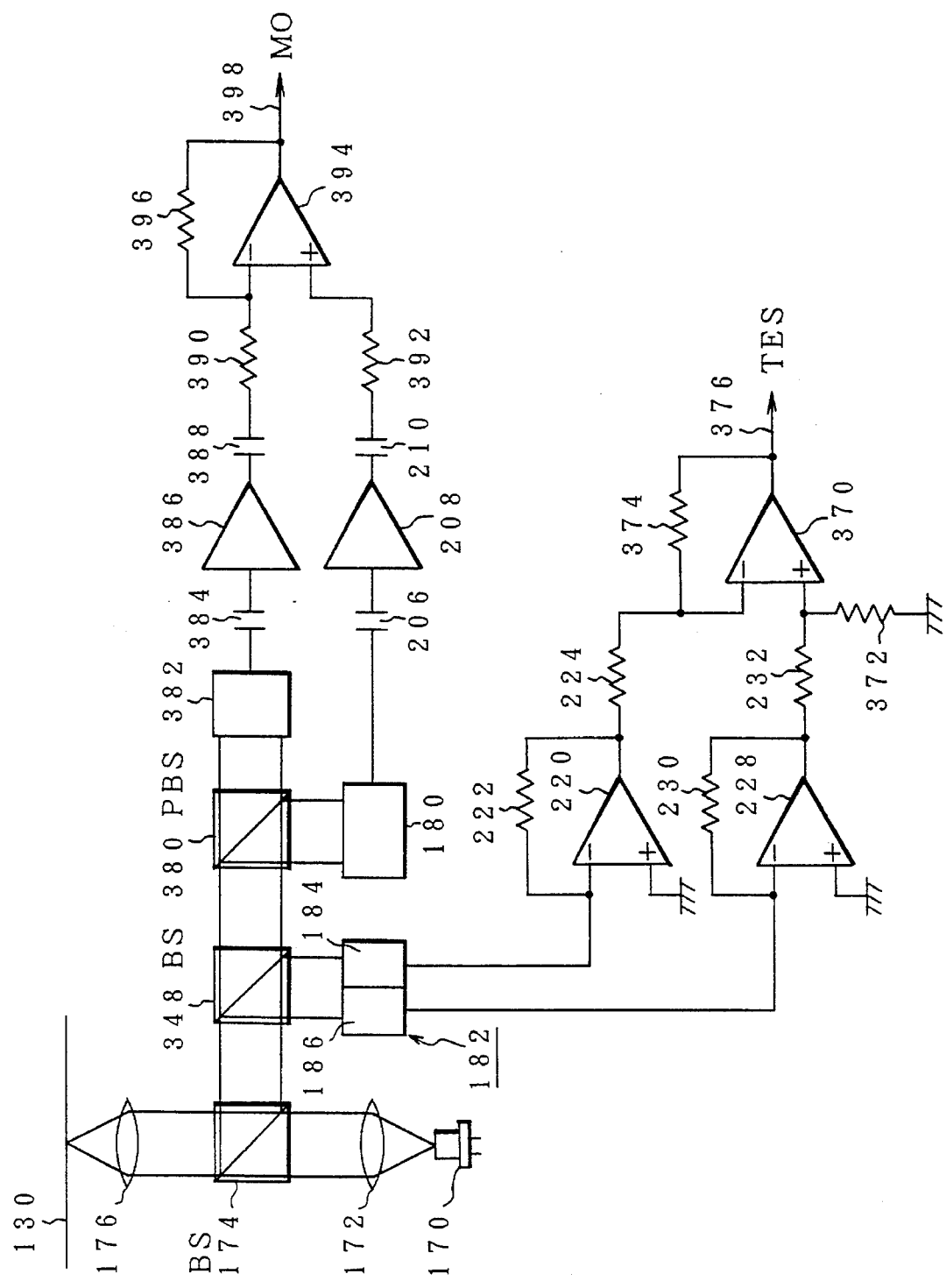
FIG. 2 is a block diagram of a conventional circuit in which a photodetector is separated for data demodulation and for servo.
Figure 3:
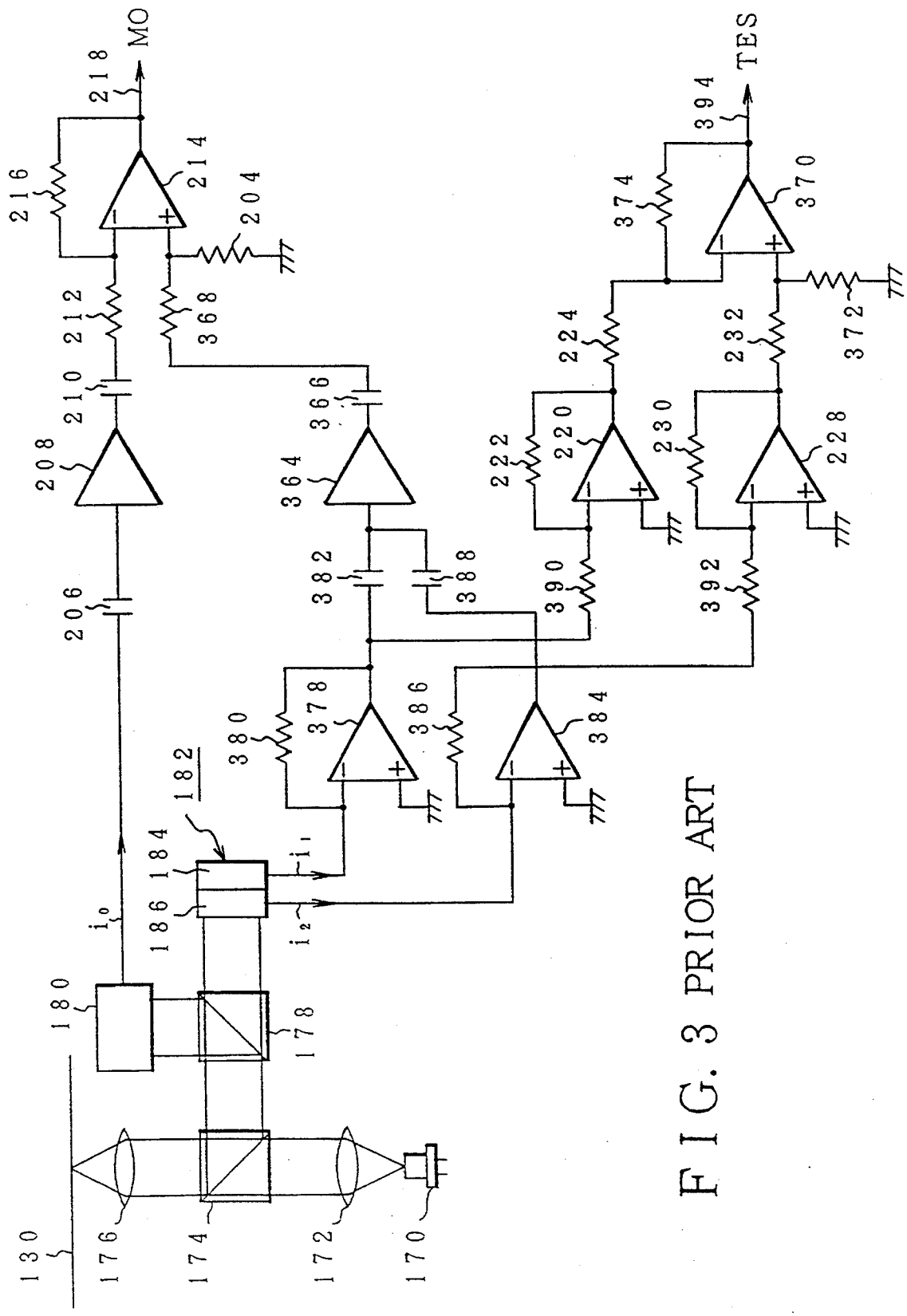
FIG. 3 is a block diagram in which a frequency band of the circuit of FIG. 2 is set to a wide band by using a high speed operational amplifier.
Figure 4:
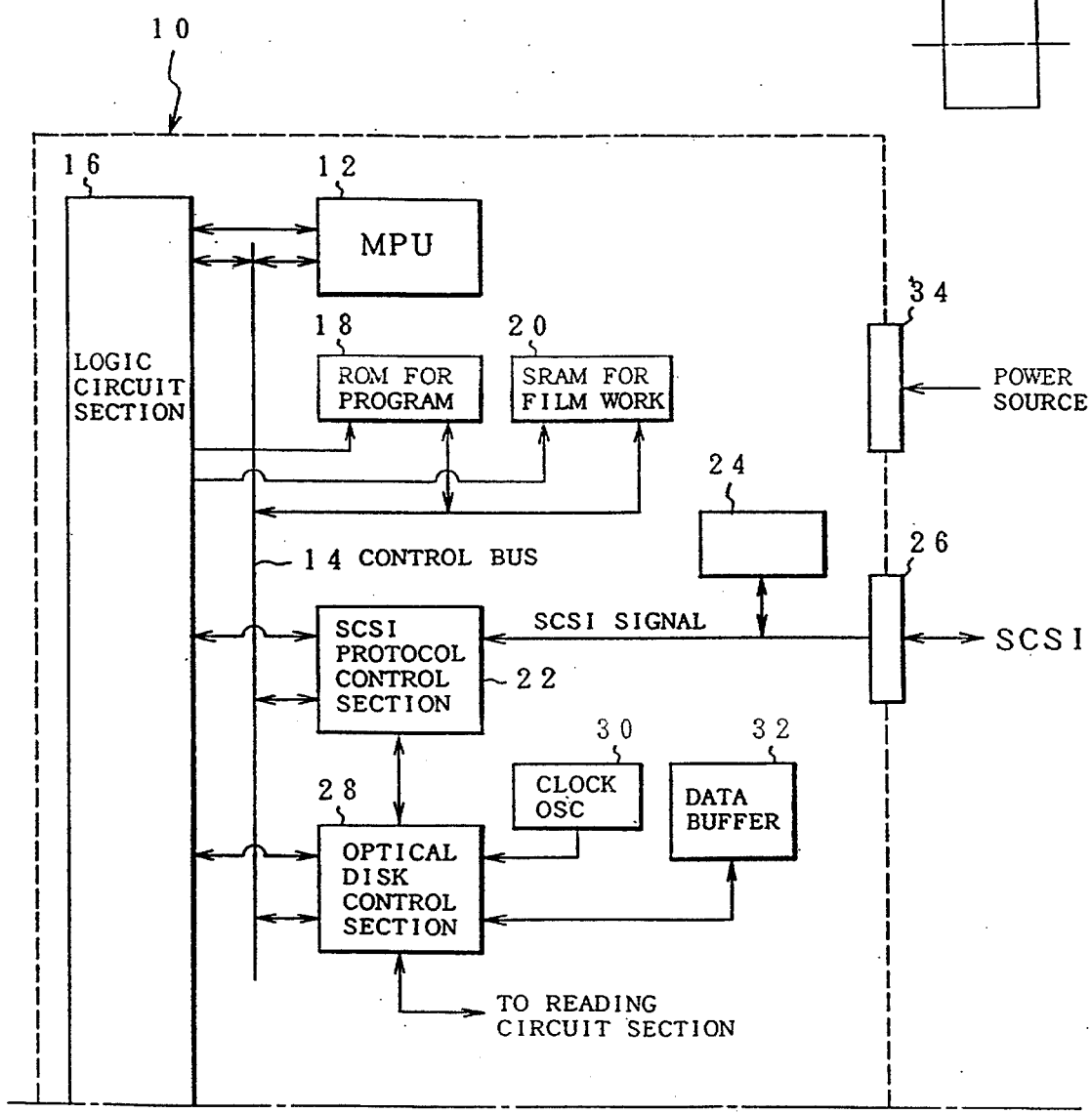
FIG. 4 is a block diagram of a hardware of the present invention.
Figure 5:
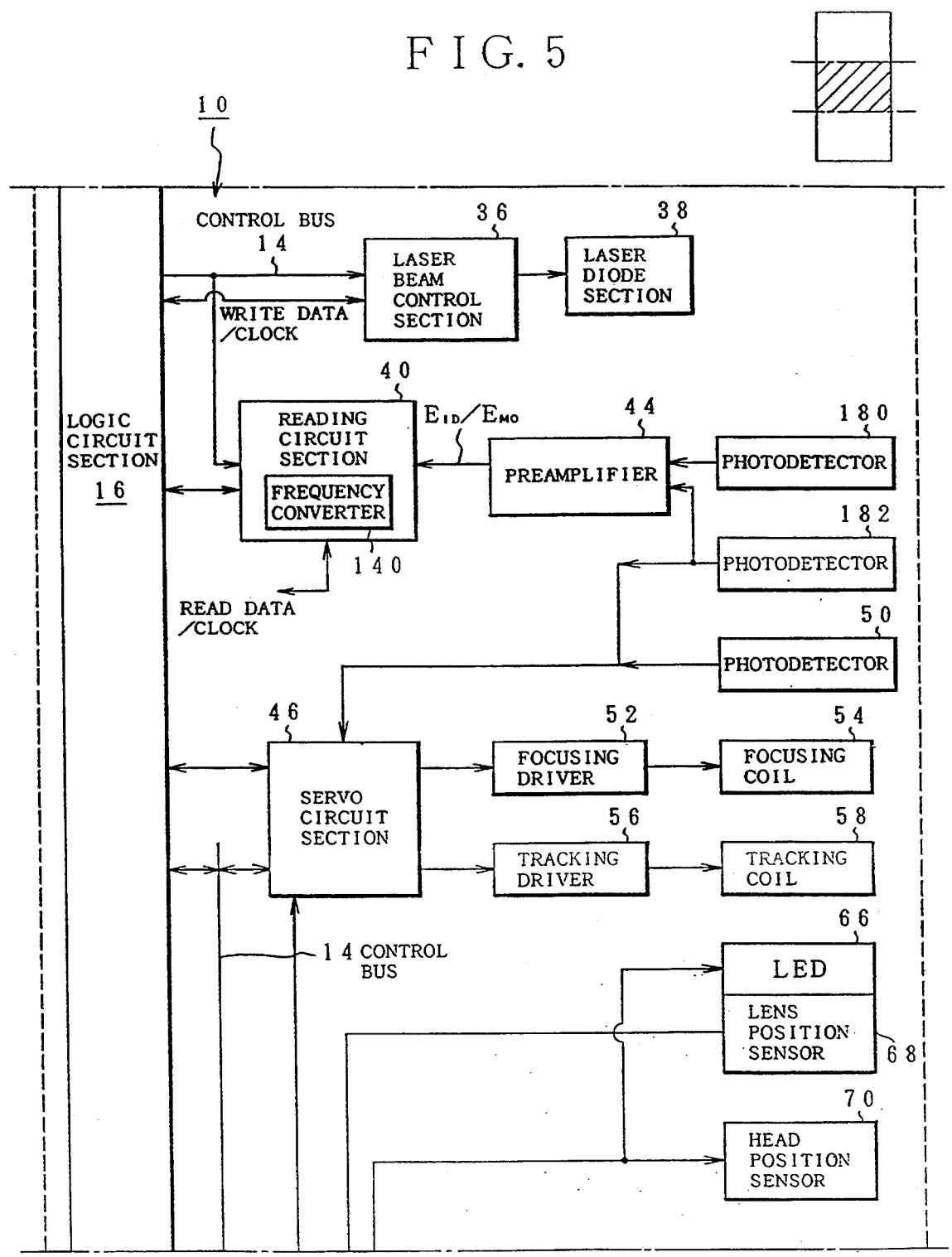
FIG. 5 is a block diagram of the hardware of the invention which continues to FIG. 4.
Figure 6:
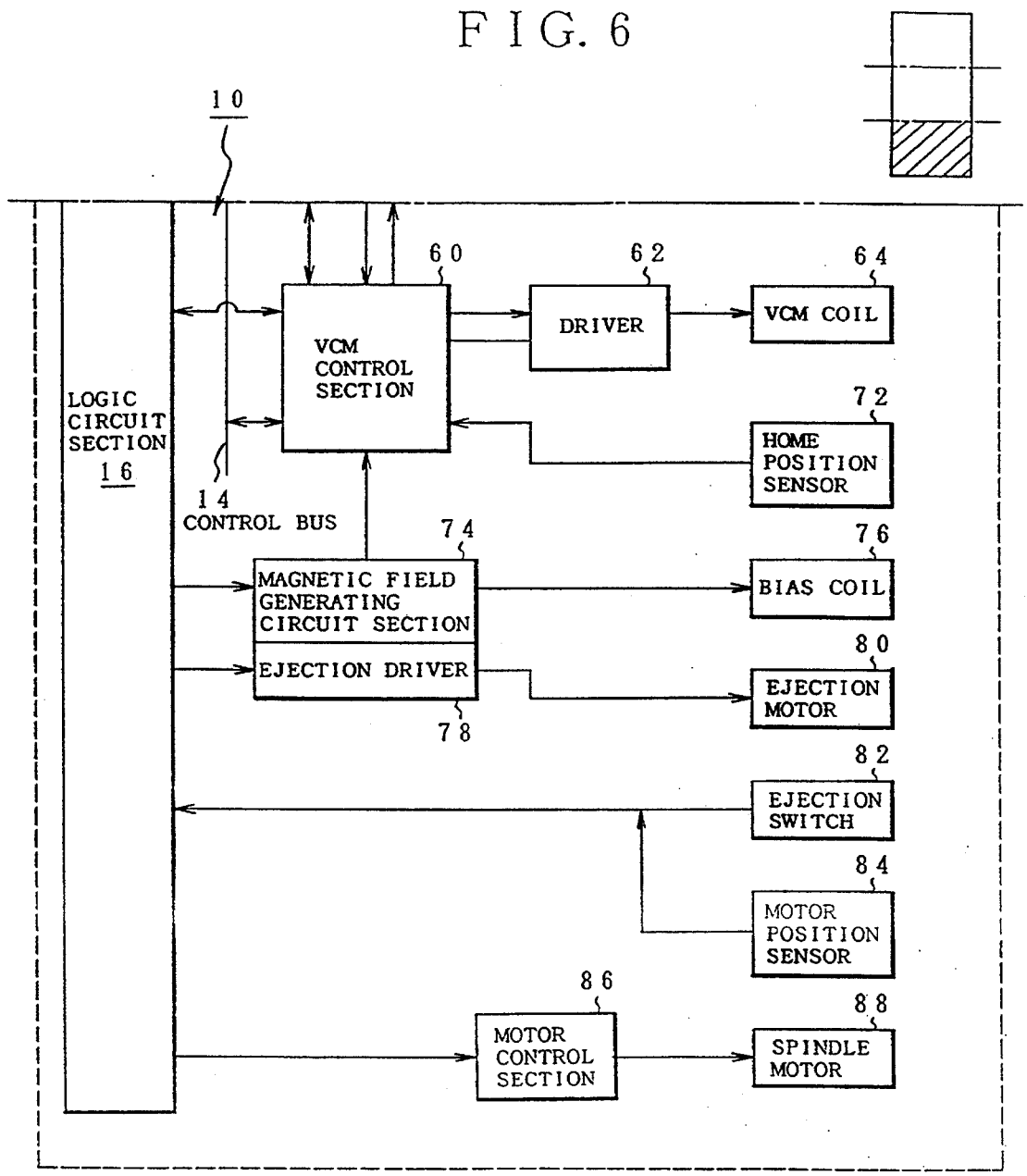
FIG. 6 is a block diagram of the hardware of the invention which continues to FIG. 5.

FIGS. 4, 5, and 6 separately show a hardware construction of an optical disk apparatus of the present invention. In FIG. 4, an MPU 12 is provided in a disk unit 10. A logic circuit section 16 to mainly transmit and receive data to/from another circuit section is provided for the MPU 12. The logic circuit section 16 is separately shown in FIGS. 5 and 6. A control bus 14 is provided for the MPU 12, thereby transmitting and receiving control information to/from another circuit section.

An ROM 18 for a program and an SRAM 20 for a firm work are provided for the MPU 12. The ROM 18 and SRAM 20 are subjected to a memory control from the MPU 12 through the control bus 14 and transfer data to another circuit section including the MPU 12 through the logic circuit section 16.

An SCSI protocol control section 22 is provided for data transfer between the disk unit 10 and an upper apparatus. The SCSI protocol control section 22 is connected to an SCSI of the upper apparatus by an SCSI connector 26. A terminal resistor 24 is branch connected to the SCSI connector 24, thereby matching a transmission impedance. An optical disk control section 28 for decoding a command from the upper apparatus and for executing the reading operation, writing operation, or the like is provided for the SCSI protocol control section 22. A clock oscillator 30 for generating a fundamental clock and a data buffer 32 for temporarily holding transfer data are provided for the optical disk control section 28.

Write data from the upper apparatus passes through the logic circuit section 16 from the SCSI protocol control section 22 and is stored into the data buffer 32 under control of the optical disk control section 28. When the apparatus enters a writable state in which data can be written to the optical disk, the data stored in the data buffer 32 is read out and is sent to a laser beam control section 36 in FIG. 5 via the logic circuit section 16 and the light emission of the light beam is controlled.

The read data read out from the optical disk is stored into the data buffer 32 via the optical disk control section 28. After that, it is read out and transferred to the upper apparatus when an interface coupling with the upper apparatus is established by the SCSI protocol control section 22.

The portion of the disk unit 10 shown in FIG. 5 will now be described. The laser beam control section 36 is shown in the portion of the disk unit 10 in FIG. 5 and controls the light emission of a laser diode built in a laser diode section 38. In the embodiment, three laser beams comprising a write beam, erase beam, and a read beam are independently generated. For this purpose, a laser diode for writing, a laser diode for erasing, and a laser diode for reading are provided for the laser diode section 38. To prevent the interference by three laser beams, a wavelength of the laser diode for reading is made different from wavelengths of the laser beam for writing and laser beam for erasing.

The laser beam control section 36 executes a write light emission, an erase light emission, or a read light emission of the laser diode section 38 on the basis of a write control signal, an erase control signal, or a read control signal from the control bus 14. With respect to the light emission in the writing operation among them, the erase beam, write beam, and read beam are sequentially arranged in accordance with the order from the head in the track running direction. Three beams can be simultaneously irradiated, thereby enabling the erasing operation and the writing operation and the reading operation for confirmation to be executed by one rotation.

A reading circuit section 40 is shown in the portion of the disk unit 10 in FIG. 5. A high frequency reproduction signal MO and a light intensity signal ID from a preamplifier 44 are input to the reading circuit section 40. The preamplifier 44 forms the high frequency reproduction signal MO and light intensity signal ID on the basis of the detection signals of the photodetector 180 for reproduction and the 2-split photodetector 182 for tracking control.

A frequency converter 140 is built in the reading circuit section 40. The frequency converter 140 frequency divides the fundamental clock from the clock oscillator 30 in FIG. 4 and generates the read clock. The read clock is used for demodulating the read data from the high frequency reproduction signal MO of the preamplifier 44. Further, the read clock is also used as a write clock and a read clock in the laser beam control section 36.

Since the optical disk apparatus of the invention uses an ZCAV (Zoomed CAV) format, the frequency converter 140 of the reading circuit section 40 is controlled so as to generate a clock frequency of a zone including a track address as a present access target recognized by the MPU 12.

A servo circuit section 46 is further provided in the portion of the disk unit 10 in FIG. 5. Detection signals of the photodetector 182 for tracking control and a photodetector 50 for focusing control are input to the servo circuit section 46. The servo circuit section 46 connects a focusing coil 54 through a focusing driver 52 as a driving load and also connects a tracking coil 58 through a tracking driver 56. The focusing coil 54 and tracking coil 58 are driving coils of an actuator of the two-dimensional swinging type of an objective lens provided in the optical head. Namely, there is executed an automatic focusing control such that the objective lens is moved in the optical axis direction by the driving of the focusing coil 54, thereby forming a beam spot as an image onto the optical disk medium surface. There is also executed a fine control (on-track control) such that the objective lens is moved in a predetermined range in the radial direction by the driving of the tracking coil 58, thereby allowing the light beam to trace onto the track center line.

Moreover, an LED 66 and a lens position sensor 68 for detecting the lens position of the lens actuator provided for the optical head are provided in the portion of the disk unit 10 in FIG. 5. By using the light from the LED 66, the lens position sensor 68 detects the position of the lens actuator which rotates by the driving of the tracking coil 58. Further, a head position sensor 70 is provided in the portion of the disk unit 10 in FIG. 5. A linear position sensor that is known as a PSD whose sensor terminal current differs depending on the irradiating position of the light is used as a head position sensor 70. According to the detection signal of the head position sensor 70, the physical absolute position at which the optical head exists at present can be recognized on the MPU 12 side.

The portion of the disk unit 10 of FIG. 6 will now be described. A voice coil motor control section (hereinafter, referred to as a VCM control section) 60 is provided for the portion of the disk unit 10 of FIG. 6. A coil (VCM coil) 64 of a voice coil motor is connected as a driving load to the VCM control section 60 through a driver 62. The movable side of the optical head can be moved in the radial direction of the optical disk by the driving of the VCM coil 64. A home position sensor 72 is connected to the VCM control section 60. The home position sensor 72 detects that the optical head has been moved to a fixedly predetermined home position of the innermost rim of the optical disk. Thus, the sensor 72 generates a detection signal. The home position that is detected by the home position sensor 72 indicates the initial position of the optical head at the time of the power-on start of the disk unit. The subsequent accessing process is started on the basis of the initial position as a reference.

A magnetic field generating circuit section 74 and an ejection driver 78 are further provided for the portion of the disk unit 10 of FIG. 6. A bias coil 76 is connected to the magnetic field generating circuit section 74. The bias coil 76 is a coil of an electromagnet provided at a position near the erase beam irradiating position of the optical disk. In the erasing mode, a current is supplied to the bias coil 76 and the coil is used to erase for aligning the magnetizing direction of the optical disk into a predetermined direction.

Since the disk unit of the embodiment is used for the detachable optical disk enclosed in a cartridge, an ejection motor 80 is driven on the basis of the ejecting operation of the operator and the optical disk chucked to a spindle motor is ejected to the outside of the apparatus. An ejection switch 82 and a motor position sensor 84 are provided in correspondence to the ejection driver 78. When the operator operates the ejection switch 82, the ejection driver 78 drives the ejection motor 80 via the logic circuit section 16. Such a motor driving is executed under a condition such that the position is detected by the position sensor 84. That is, when it is detected by the motor position sensor 84 that the ejection motor 80 is located at a loading position, the ejection driver 78 drives the ejection motor 80 in response to the operation of the ejection switch 82, thereby ejecting the disk cartridge to the outside.

Further, a motor control section 86 is provided in the circuit portion of the disk unit 10 of FIG. 6. The optical disk is rotated at a constant speed by the driving of a spindle motor 88.

[Servo circuit system]

Figure 7:
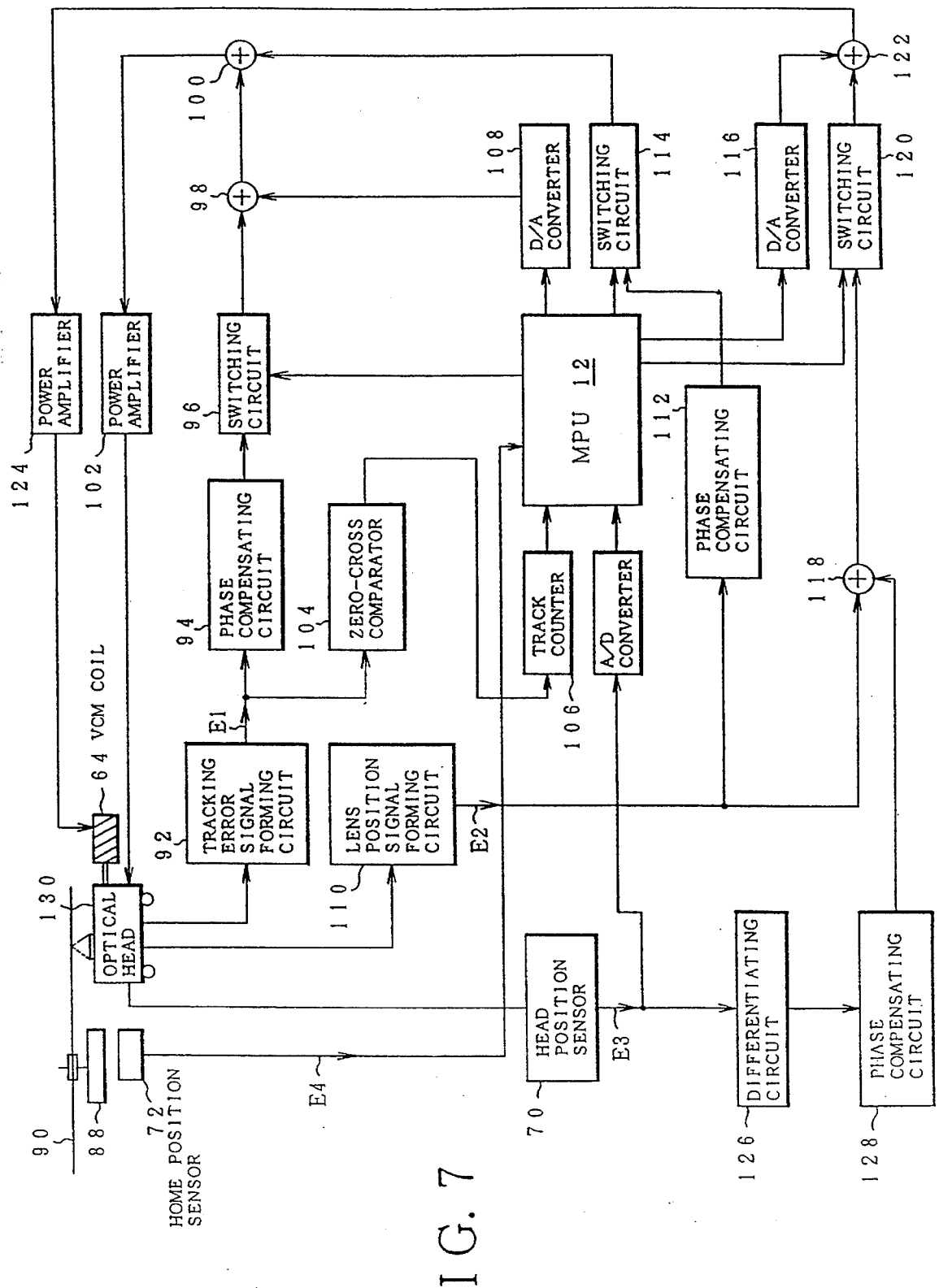
FIG. 7 is a block diagram of a servo circuit section of the invention.

FIG. 7 shows the details of the servo circuit section 46 provided in the disk unit 10 in FIGS. 4 to 6. An optical disk medium 90 is rotated at a constant speed by the spindle motor 88. The optical head 130 is provided for the optical disk medium 90 so as to be movable in the radial direction. The optical head 130 is driven by the VCM coil 64. The photodetector 180 for reproduction, photodetector 182 for tracking control, and photodetector 50 for focusing control in FIG. 5 are assembled in the optical head 130. The detection signal from the photodetector 182 for tracking control is supplied to a tracking error signal forming circuit 92, thereby forming a tracking error signal E1. The tracking error signal E1 is a signal which cyclically changes each time the optical head 130 transverses the track in the seeking operation in which the optical head 130 is moved in the radial direction of the optical disk 90. On the other hand, in the on-track control in which the beam from the optical head 130 is located at the center of the track, the tracking error signal E1 is a signal whose signal level linearly changes in accordance with a beam deviation amount from the track center.

A zero-cross point of the tracking error signal E1 during the seeking operation of the optical head 130 is detected by a zero-cross comparator 104 and is given to a track counter 106. The track counter 106 counts the number of detection pulses of the zero-cross comparator 104 and obtains the number of tracks through which the head passed. Specifically speaking, the count value of the track counter 106 has been reset to 0 at the detecting position of the optical head 130 by the home position sensor 72, namely, at the initial position of the optical head. When the optical head 130 is moved to the outer rim side from the home position of the home position sensor 72, the track counter 106 counts up the count value each time the head passes the track. The counter 106 counts down the count value when the head moves to the inner rim side. Therefore, the count value of the track counter 106 indicates the number of tracks from the home position.

The tracking error signal E1 that is generated from the tracking error signal forming circuit 92 during the on-track control is subjected to a compensation of a lead phase by a phase compensating circuit 94. After that, the compensated signal is supplied to a power amplifier 102 through a switching circuit 96 and adders 98 and 100. An output current from the power amplifier 102 drives a lens actuator provided for the optical head 130. Therefore, the switching circuit 96 is turned off in case of the seek control by the MPU 12 and is turned on by the track pull-in after completion of the seeking operation.

The detection signal from the lens position sensor 68 in FIG. 5 provided for the optical head 130 is supplied to a lens position signal forming circuit 110. The lens position signal forming circuit 110 generates a lens position signal E2 which is set to 0 at the neutral position of the lens actuator and which linearly changes to the plus side by the movement to one direction and which changes to the minus side by the movement in the opposite direction. The lens position signal E2 from the lens position signal forming circuit 110 is subjected to a compensation of a lead phase by a phase compensating circuit 112. The compensated signal is supplied to the adder 100 through a switching circuit 114.

The switching circuit 114 is turned on upon seeking by the MPU 12 and is turned off at the time of track pull-in. Therefore, the switching circuit 114 is turned on upon seeking and the lens position signal E2 from the phase compensating circuit 112 is supplied to the power amplifier 102 through the adder 100, thereby driving the lens actuator of the optical head 130. For this purpose, a servo position control for setting the lens position signal E2 to 0 and for always keeping the lens actuator at the neutral position is executed.

A D/A converter 108 receives predetermined offset data by the MPU 12 upon seeking and gives an offset signal to the lens position signal E2 by the adder 100 through the adder 98. Due to this, the lens actuator of the optical head 130 can be offset as necessary during the seeking operation. For example, in the MPU 12, when the number of remaining tracks to the target track decreases to a predetermined value during the movement of the optical head 130 by the VCM coil 64, offset data is given to the D/A converter 108, thereby rotating the lens actuator to the target track side. Simultaneously with the movement of the optical head 130, the beam is moved to the target track by the lens actuator, thereby enabling the track pull-in to be executed at a high speed.

The control of the VCM coil 64 that is driven by a power amplifier 124 is realized by setting control data into a D/A converter 116 by the MPU 12. An output of the D/A converter 116 is given to the power amplifier 124 through an adder 122. Namely, upon seeking, the MPU 12 sets specified VCM coil drive data to the D/A converter 116 and executes the seeking operation by the movement of the optical head 130. For example, predetermined acceleration data is set into the D/A converter 116 at the start of the seeking operation. After the acceleration, speed control data is set so as to obtain a specific target speed. When the number of remaining tracks to the target track decreases to a specified value, deceleration data is set, thereby performing a deceleration control. For the purpose of such a speed control during the seeking operation of the optical head 130, a head position signal E3 from the head position sensor 70 to detect the physical position of the optical head 130 is converted into digital data by an A/D converter 125 and is given to the MPU 12. The MPU 12 obtains speed information of the optical head 130 from the head position signal converted by the A/D converter 125 and sets speed control data into the D/A converter 116 so as to maintain a preset target speed.

Further, the head position signal E3 from the head position sensor 70 is differentiated by a differentiating circuit 126 and is subjected to a phase compensation by a phase compensating circuit 128. After that, the compensated signal is supplied to the adder 122 through an adder 118 and a switching circuit 120. The switching circuit 120 is controlled by the MPU 12 so as to be turned off upon seeking and to be turned on at the time of track pull-in. Therefore, when the switching circuit 120 is turned on by the MPU 12 at the time of track pull-in, the optical head 130 is in a deceleration control state at this time and a differentiation component of the head position signal E3 in the deceleration control is fetched into a speed control loop of the optical head 130 by the VCM coil 64, thereby raising the stability at the time of track pull-in.

Further, the lens position signal E2 from the lens position signal forming circuit 110 is added to the adder 118. When the switching circuit 120 is turned on at the time of track pull-in by the MPU 12, a servo position control to set the lens position signal E2 into 0 for the VCM coil 64 is executed in an on-track control (fine control) state after completion of the track pull-in. The servo position control is based on a double servo that is applied to the servo control of the on-track to drive the lens actuator by the tracking error signal E1. In the double servo, in the case where the lens actuator of the optical head 130 is moved in the track deviation direction from the neutral position on the basis of the tracking error signal E1, a position control to drive the optical head 130 by the VCM coil 64 is performed so as to set the lens position signal E2 indicative of the deviation detected by the lens position forming circuit 110 to 0.

The operation of the servo circuit section in FIG. 7 will now be described. The seek control is now classified into a coarse control to move the optical head to the target track by the speed control and a fine control to execute the track pull-in when the head arrives at the target track. The above controls are also called a speed control and a position control. When the deviation from the track center is corrected so as to lie within a predetermined value by the fine control, the on-track is judged and the seeking operation is now completed. After that, the on-track control for allowing the light beam to trace the track center is executed.

First, when the MPU 12 receives a seeking command from an upper apparatus, an address of the target track is recognized and the number of tracks to the target track is calculated from the present value of the track address counted by the track counter 106. Subsequently, the MPU 12 turns off the switching circuits 96 and 120 and simultaneously turns on the switching circuit 114. Predetermined acceleration data is set into the D/A converter 116. Therefore, an acceleration voltage is supplied from the D/A converter 116 to the power amplifier 124 through the adder 122 and an acceleration current is supplied to the VCM coil 64. Thus, the optical head 130 starts to move in the direction of the target track by the driving of the VCM coil 64. A change in head position by the movement of the optical head 130 is detected by the head position sensor 70. The MPU 12 transmits the head position signal E3 to the MPU 12 through the A/D converter 125 and obtains the speed. When the target speed is derived, the MPU 12 switches the control mode from the acceleration control to the constant speed control. During the constant speed control, the speed control data is set into the D/A converter 116 so as to set a deviation between the actual speed and the target speed into 0.

The zero-cross comparator 104 generates a track crossing pulse in response to the tracking error signal E1 that is generated from the tracking error signal forming circuit 92 in association with the movement of the optical head 130 during the coarse control. The number of track crossing pulses is counted by the track counter 106. On the basis of the count value of the track counter 106, the MPU 12 subtracts the count value of the track counter 106 from the number of tracks to the target track obtained at the time of the start of the seeking operation, thereby monitoring the number of remaining tracks. When the number of remaining tracks decreases to a predetermined value, the MPU 12 sets the deceleration data into the D/A converter 116. A deceleration voltage of an opposite polarity is generated from the D/A converter 116 to the power amplifier 124 through the adder 112. The deceleration control of the optical head 130 is performed by the deceleration driving of the VCM coil 64. In this instance, if necessary, it is also possible to construct in a manner such that the offset data is set into the D/A converter 108 and an objective lens is forcedly offset in the target track direction by the driving of the lens actuator by the power amplifier 102 and the beam is early pulled in the target track. During the coarse control, the switching circuit 114 is turned on and a position control so as to keep the lens actuator provided for the optical head 130 at the neutral position by the lens position signal E2 is executed.

In the MPU 12, when the number of remaining tracks to the target track is equal to 0 or a value just before 0, the switching circuit 114 is turned off and the switching circuits 96 and 120 are also turned on, thereby performing the track pull-in to switch the control mode to the fine control. That is, there is executed the fine control such that the tracking error signal E2 is driven by the power amplifier 102 through the phase compensating circuit 94, switching circuit 96, and adders 98 and 100 by the turn-on of the switching circuit 96 and the lens actuator provided for the optical head 130 is driven so as to position the beam to the center of the target track. On the other hand, the speed change at the time of the deceleration pull-in of the optical head 130 is fetched as a differentiation component of the head position signal E3. A hunting of the lens actuator after completion of the track pull-in is suppressed, thereby performing the stable track pull-in.

When the pull-in control to the target track is completed and the deviation is equal to or less than the predetermined value for the track center, the on-track state is judged and the seeking operation is completed. The on-track control based on the tracking error signal E1 is executed. When the lens actuator of the optical head 130 moves the lens by the on-track control in order to allow the beam to trace the track, a change in lens position is captured by the lens position signal E2 and the lens actuator is returned to the neutral position by the driving of the VCM coil 64. In this manner, the double servo by the position servo is executed. In the on-track control state, the reading operation or writing operation by the optical head 130 is performed.

[Structure of optical head and optical system]

Figure 8:
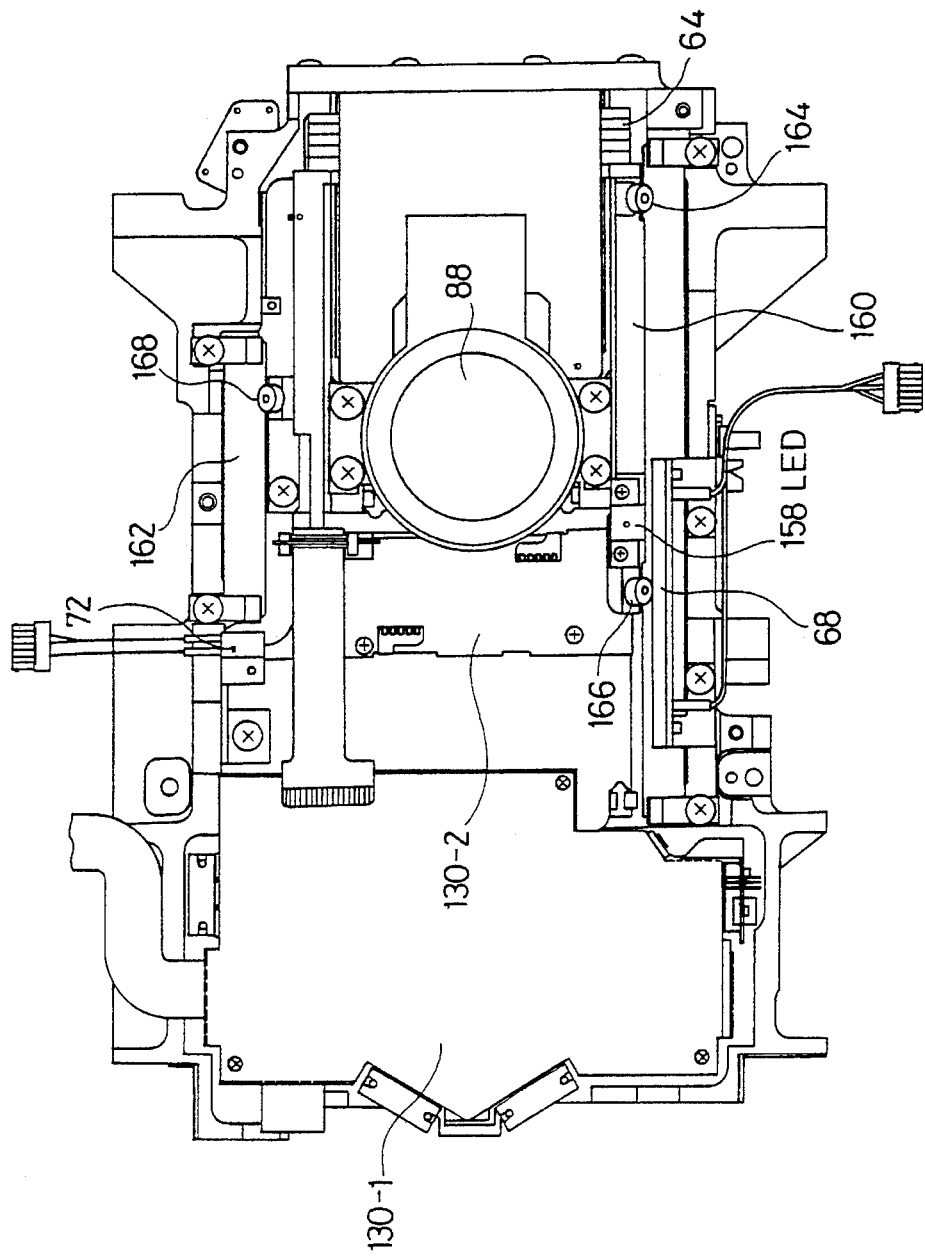
FIG. 8 is a plan view showing a head driving mechanism of the invention when it is shown from the back side.

FIG. 8 shows an embodiment of a mechanism structure of the optical head in the disk apparatus of the invention by a plan view when it is seen from the bottom portion side provided with the spindle motor. A fixed head 130-1 is arranged on the right side of a frame 155. A pair of rails 160 and 162 are provided on the frame on the right side which faces the fixed head 130-1. A moving head 130-2 is arranged for the rails 160 and 162 so as to be movable by rollers 164, 166, and 168. The spindle motor 88 is attached and fixed from the back side to the right side of the moving head 130-2. The optical disk medium in the cartridge loaded from the outside is attached to a chucking section of a rotary shaft on the front side of the spindle motor 88. An LED 158 is arranged on one side of the moving head 130-2 so as to irradiate the light to the outside. The head position sensor 70 is arranged at the position along the moving direction of the moving head 130-2 of the frame 155 which the LED 158 faces. The head position sensor 70 is arranged over a moving range of the moving head 130-2. When the light from the LED 158 is irradiated to the head position sensor 70 in accordance with the moving position of the moving head 130-2, a current signal according to the position at which the light is irradiated is generated from the head position sensor 70. Due to this, the moving position of the moving head 130-2 can be linearly detected. The home position sensor 72 is arranged on the opposite side of the head position sensor 70. In a state shown in the diagram, the moving head 130-2 has already been moved to the initial position at which the beam is irradiated to the home position of the innermost rim of the optical disk medium. In this state, the home position sensor 72 generates a detection signal of the home position.

Figure 9:
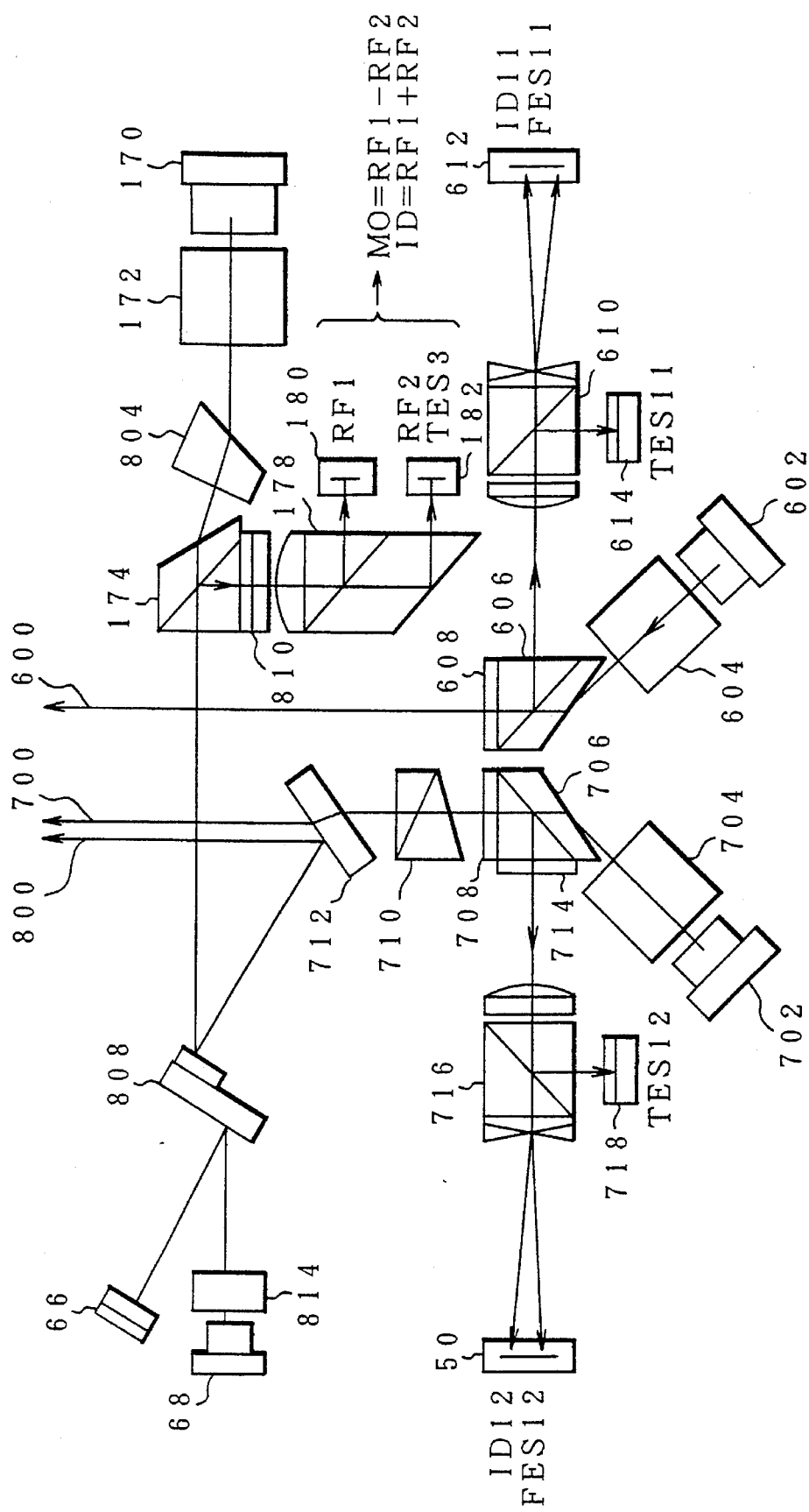
FIG. 9 is an explanatory diagram of an optical unit built in a head fixing section in FIG. 8.

FIG. 9 shows the details of the optical system built in the head fixing section in FIG. 8. First, the optical system of an erasing beam 600 will be described. The light from a laser diode 602 for erasing beam is converted into the parallel beam by a collimating lens 604. The parallel beam passes through a beam splitter 606 and a λ/4 plate 608 and arrives at an objective lens 40 of the movement optical system and is irradiated onto the optical disk medium. The return light by the erasing beam 600 from the optical disk medium is reflected by the polarization beam splitter 606 in the direction in which it perpendicularly crosses. After that, the reflected light passes through a Foucault optical section 610 and enters a photodetector 612. From a light reception output of the photodetector 612, a focusing error signal FES11 of the erasing beam 600 and a light intensity signal ID11 of a track preformat section are obtained. The return beam separated by the Foucault optical section 610 enters a photodetector 614 and is used to obtain the tracking error signal TES11 according to a push-pull method (far field method).

An optical system of a writing beam 700 will now be described. The writing beam 700 is emitted as a light pulse from a laser diode 702 for writing so as to obtain a writing power in accordance with the data bit 1 or 0. The writing beam 700 is converted into the parallel beam by a collimating lens 704. After that, the parallel beam passes through a polarization beam splitter 706, a λ/4 plate 708, a color correction prism 710, and a dichroic mirror 712 and is irradiated onto the optical disk medium via the objective lens of the movement optical system. The return light from the optical disk medium passes along the same path and enters the polarization beam splitter 706 and is reflected in the direction in which it perpendicularly crosses. The reflected light passes through a long pass filter 714 and enters a Foucault optical section 716. The Foucault optical section 716 is provided to obtain a focusing error signal FES12 by a Foucault method. The beam from the Foucault optical section 716 enters the photodetector 50, thereby producing the focusing error signal FES12 regarding the writing beam 700 and a light intensity signal ID12 according to the concave and convex portions of the track preformat portion. The return light of the writing beam 700 reflected in the Foucault optical section 716 in the perpendicularly crossing direction is transferred to a photodetector 718 and is used to obtain a tracking error signal TES12 of the writing beam 700 according to the push-pull method (far field method). When a verification reading operation is performed by a reproducing beam 800 simultaneously with the writing operation by the writing beam 700, each return light of the reproducing beam 800 is received from the optical disk medium together with the writing beam 700. Therefore, the long pass filter 714 is provided, thereby allowing only the return light of the writing beam 700 of a long wavelength to pass and shutting off the return light of the reproducing beam 800 of a short wavelength.

An optical system of the reproducing beam 800 will now be described. The light from the laser diode 170 for reproduction is converted into the parallel beam by the collimating lens 172. After that, the optical path of the parallel beam is changed by a prism 804 and the beam passes through the beam splitter 174 and enters a galvano mirror 808. The reproduction beam 800 reflected by the galvano mirror 808 is reflected by the dichroic mirror 712 and passes through the objective lens of the movement optical system and is irradiated onto the optical disk medium. The return light of the reproduction beam 800 from the optical disk medium is reflected by the dichroic mirror 712 and passes through the galvano mirror 808 and enters the beam splitter 174 and is reflected in the direction in which it perpendicularly crosses. The return light reflected by the beam splitter 174 passes through a λ/4 plate 810 and enters the polarization beam splitter 178. The reflected (S) polarization component enters the photodetector 180. The transmitted (P) polarization component enters the photodetector 182. A tracking error signal TES3 and a high frequency signal RF2 based on the reproduction beam 800 are produced from the light reception output of the photodetector 182 in accordance with the push-pull method (far field method). A high frequency signal RF1 is produced from the light reception output of the photodetector 180. The high frequency signals RF1 and RF2 derived on the basis of the light reception outputs of the photodetectors 180 and 182 are converted into the reproduction signal MO by a subtraction. An ID signal indicative of the light intensity due to the concave and convex portions of the preformat portion is obtained by the sum of the high frequency signals RF1 and RF2. That is, the reproduction signal MO and the ID signal can be obtained by

MO=RF1−RF2

ID=RF1+RF2

Further, the laser diode (LED) 66, a collimating lens 814, and the lens position sensor 68 using a 2-split photodetector for detecting the mirror position are provided for the galvano mirror 808 provided for the optical system of the reproducing beam 800. The light emitted from the laser diode 66 is converted into the parallel beam by the collimating lens 814. After that, the parallel beam is reflected by the rear surface of the galvano mirror 808 and enters the lens position sensor 68. A detection signal of the lens position sensor 68 is set to 0 at the neutral position of the galvano mirror 808. A position signal whose polarity is set to a different polarity of plus or minus in accordance with the inclination direction of the galvano mirror 808 is generated.

[Realization of wide band of servo error signal]

Figure 10:
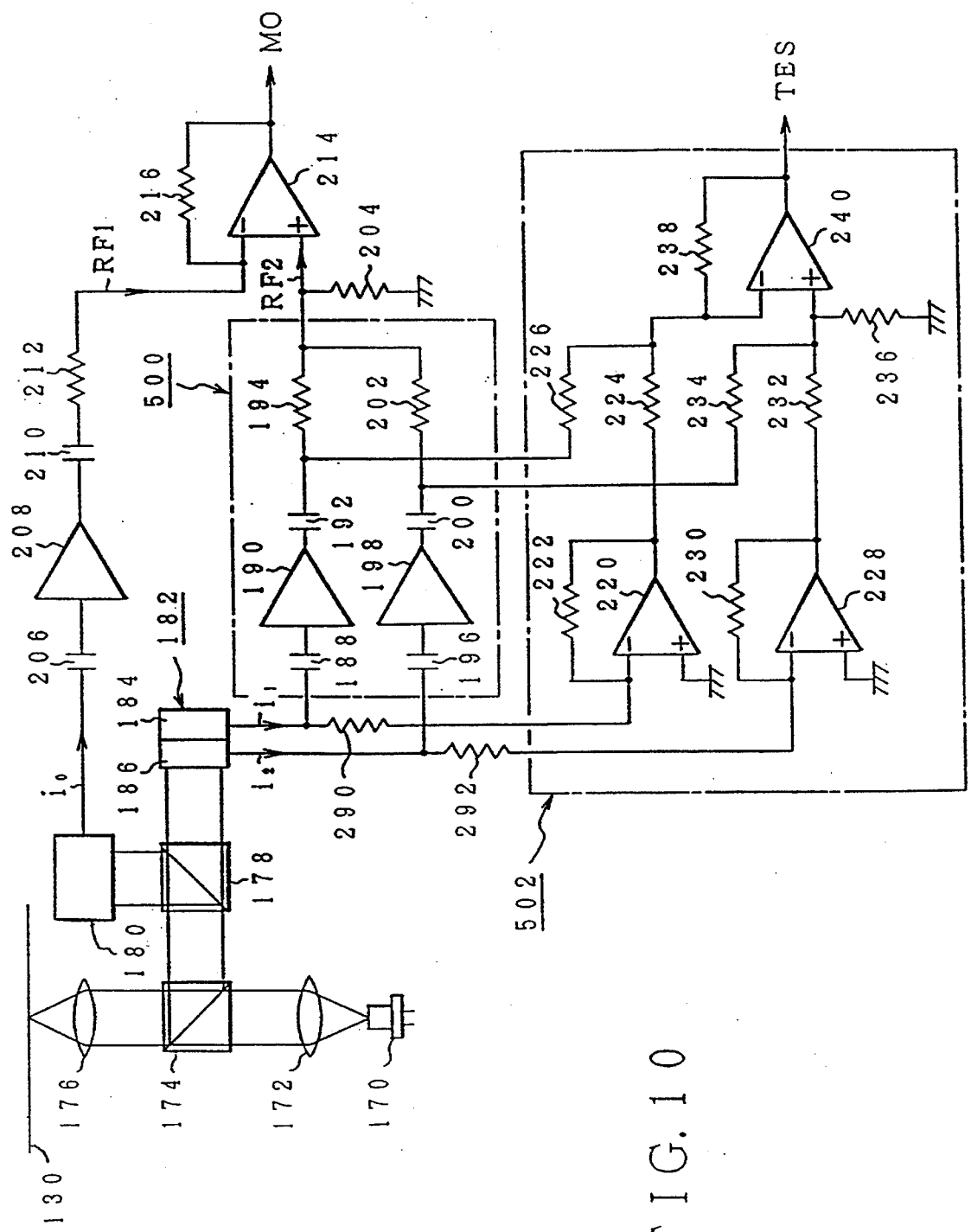
FIG. 10 is a block diagram of an embodiment of the invention.

FIG. 10 shows an embodiment of a circuit for widening a band of a servo signal in association with a high seeking speed. An outline of the reading optical system is shown. The reading optical system has the laser diode 170 for reading. The laser diode 170 for reading emits a laser beam of a wavelength in a range from 780 to 789 nm. On the other hand, each of the laser diode for erasing and the laser diode for writing emits a laser beam of a wavelength within a range from 836 to 845 nm. The laser beam from the laser diode 170 for reading is converted from a spherical wave to a plane wave by the collimating lens 172 and is transmitted through the beam splitter 174 which functions as a half mirror. The plane wave is converged by the objective lens 176 and a beam spot is formed as an image on the surface of the optical disk medium 130. A micro track structure in which both sides of the track portion were notched by grooves has been preformatted on the surface of the optical disk medium 130. The beam spot of the reading beam irradiated from the objective lens 176 is reflected and diffracted and its primary diffraction light is returned to the laser diode 170 side. The return light is reflected by the beam splitter 174. The (P) polarization component of the return light is transmitted through the polarization beam splitter 178 and an image of the primary diffraction light of the medium surface is formed on the 2-split photodetector 182. The (S) polarization component of the return light is reflected by the polarization beam splitter 178 and an image is formed on the photodetector 180. The 2-split photodetector 182 is used for both of the servo and the reproduction signal and has divided light receiving sections 184 and 186. The light receiving sections 184 and 186 of the 2-split photodetector 182 generate the detection currents $i_1$ and $i_2$ according to the image of the primary diffraction light by the track of the laser beam known as a push-pull method (far field method).

Figure 11A:
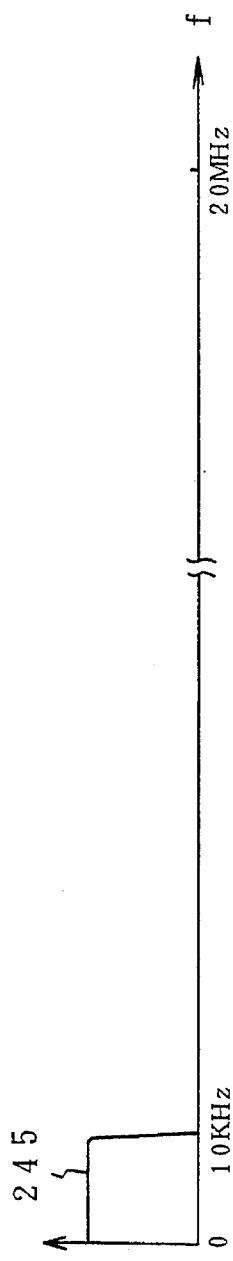
FIGS. 11A to 11D are explanatory diagrams of frequency characteristics of a signal in each section in FIG. 10.
Figure 11B:
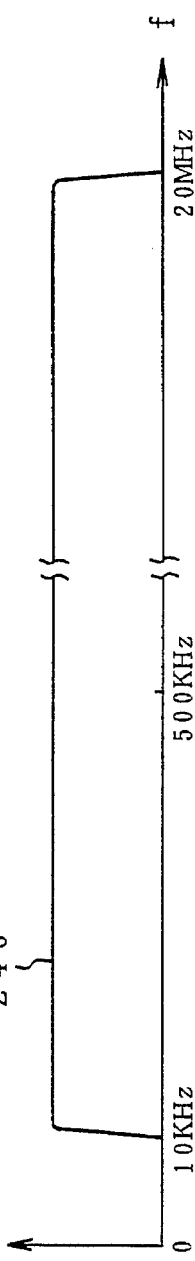

A first circuit section 500 to form the high frequency signal RF2 that is used to form the reproduction signal MO is provided for the 2-split photodetector 182. A second circuit section 502 to form the tracking error signal TES that is used for the seek control and the on-track control by the servo circuit section is provided for the 2-split photodetector 182. As a frequency band of the tracking error signal TES of the second circuit section 502, band characteristics 245 in a range from DC to 500 kHz or higher in FIG. 11A are required in association with the high speed of the seeking operation. As a frequency band of the reproduction signal MO, frequency band characteristics 246 in a range in which a low cut-off frequency is equal to or higher than 10 kHz and a high cut-off frequency is equal to or higher than 20 MHz in FIG. 11B are required.

The first circuit section 500 to form the high frequency signal RF2 that is used to form the reproduction signal MO will be first described with reference to FIG. 10. Operational amplifiers 190 and 198 are provided for the first circuit section 500. General video amplifiers such as TL592 or the like can be used as operational amplifiers 190 and 198 so long as it is sufficient to set the low cut-off frequency to, for instance, 10 kHz. The light receiving sections 184 and 186 of the 2-split photodetector 182 are AC coupled to the operational amplifiers 190 and 198 by the capacitors 188 and 196, respectively. The operational amplifiers 190 and 198 receive the detection currents $i_1$ and $i_2$ from the light receiving sections 184 and 186 and convert into the voltage signals proportional to the input currents. The voltage signals are generated through capacitors 192 and 200. The detection signals of the light receiving sections converted into the voltage signals by the operational amplifiers 190 and 198 are added and connected via resistors 194 and 202. That is, the high frequency signal RF2 of the voltage proportional to the sum $(i_1+i_2)$ of the detection currents added at a gain of about 1 is derived. On the other hand, the detection current $i_0$ from the photodetector 180 that is proportional to the light power of the image of the (S) polarization component reflected by the polarization beam splitter 178 is AC coupled to the operational amplifier 208 through the capacitor 206. A video amplifier whose low cut-off frequency is set to, for example, 10 kHz, which is the same as that of the operational amplifiers 190 and 198 can be used as an operational amplifier 208. The operational amplifier 208 converts the detection current $i_0$ into the voltage signal. The voltage signal proportional to the detection current $i_0$ of the operational amplifier 208 is supplied to the operational amplifier 214 which operates as a differential amplifier through the capacitor 210 and a resistor 212 and becomes the high frequency signal RF1 that is used to form the reproduction signal MO. The operational amplifier 214 outputs the reproduction signal MO as a difference between the two high frequency signals RF1 and RF2. That is, there is the following relation.

$$MO=RF1-RF2=i_0-(i_1+i_2)$$

Figure 11C:
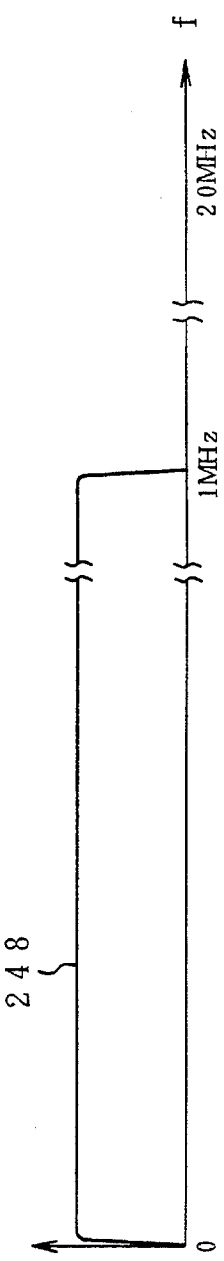
Figure 11D:
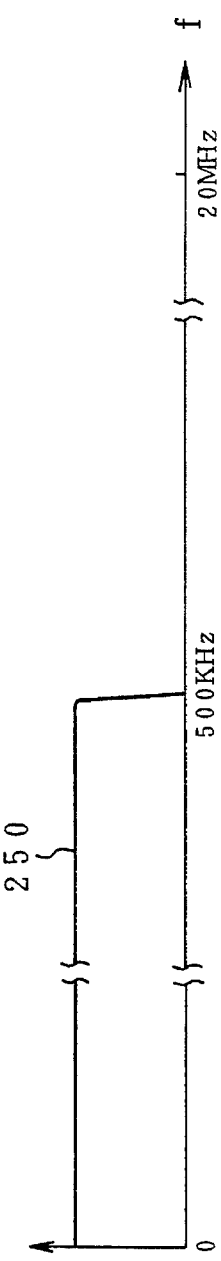

The second circuit section 502 to form the tracking error signal TES will now be described with reference to FIG. 10. The operational amplifiers 220 and 228 are provided for the second circuit section 502. Signals from the two light receiving sections 184 and 186 of the 2-split photodetector 182 are inputted through resistors 290 and 292 and are current/voltage converted. In the signals from the light receiving sections 184 and 186, frequency components higher than 10 kHz pass through the capacitors 188 and 196 and are inputted to the amplifiers 190 and 200. Therefore, the operational amplifiers 220 and 228 handle the frequency components in a range from DC to 10 kHz. The operational amplifiers 220 and 228 have feedback resistors 222 and 230 and convert the detection currents $i_1$ and $i_2$ into the voltage signals. General operational amplifiers whose frequency bands lie within a range from about DC to 1 MHz are used as operational amplifiers 220 and 228, so that the frequency band in a range from DC to 500 kHz in association with the high seeking speed can be sufficiently covered. The detection voltages converted by the operational amplifiers 220 and 228 in accordance with the detection currents $i_1$ and $i_2$ are added through the resistors 224 and 232 to the detection voltages supplied through resistors 226 and 234 from the operational amplifiers 190 and 198 of the first circuit section 500, respectively. A frequency band of the detection voltage from each of the operational amplifiers 220 and 228 of the second circuit section 502 lies within a range from DC to 10 kHz. On the other hand, a frequency band of the detection voltage from each of the operational amplifiers 190 and 198 of the first circuit section 500 lies within a range from 10 kHz to 20 MHz. Therefore, a frequency band of the added detection signal has frequency band characteristics 248 in a range from DC to 1 MHz in FIG. 11C. The operational amplifier 240 at the final stage of the second circuit section 502 is a differential amplifier and receives the detection voltages corresponding to the detection currents $i_1$ and $i_2$ having the wide band frequency characteristics 248 in FIG. 11C and generates the tracking error signal TES as a detection voltage proportional to $(i_1-i_2)$. Although the tracking error signal TES that is output from the second circuit section 502 has the frequency band characteristics 248 in a range from DC to 1 MHz in FIG. 11C, they are excessively extended to the high frequency component. Therefore, as necessary, subsequent to the second circuit section 502, the signal is transmitted through a low pass filter having a cut-off frequency of, for example, 500 kHz, thereby finally outputting the tracking error signal having frequency band characteristics 250 of DC to 500 kHz shown in FIG. 11D to the servo circuit section.

According to the embodiment of FIG. 10 as mentioned above, by adding the high frequency component of the signal formed in the first circuit section 500 for the reproduction signal without using the operational amplifier of a wide band for the second circuit section 502 for the servo circuit, the tracking error signal of a wide band in a range from DC to 20 MHz can be formed. Since the 2-split photodetector 182 is commonly used for reproduction and for servo, the optical system can be simplified and miniaturized.

[Second embodiment of realization of wide band of servo error signal]

Figure 12:
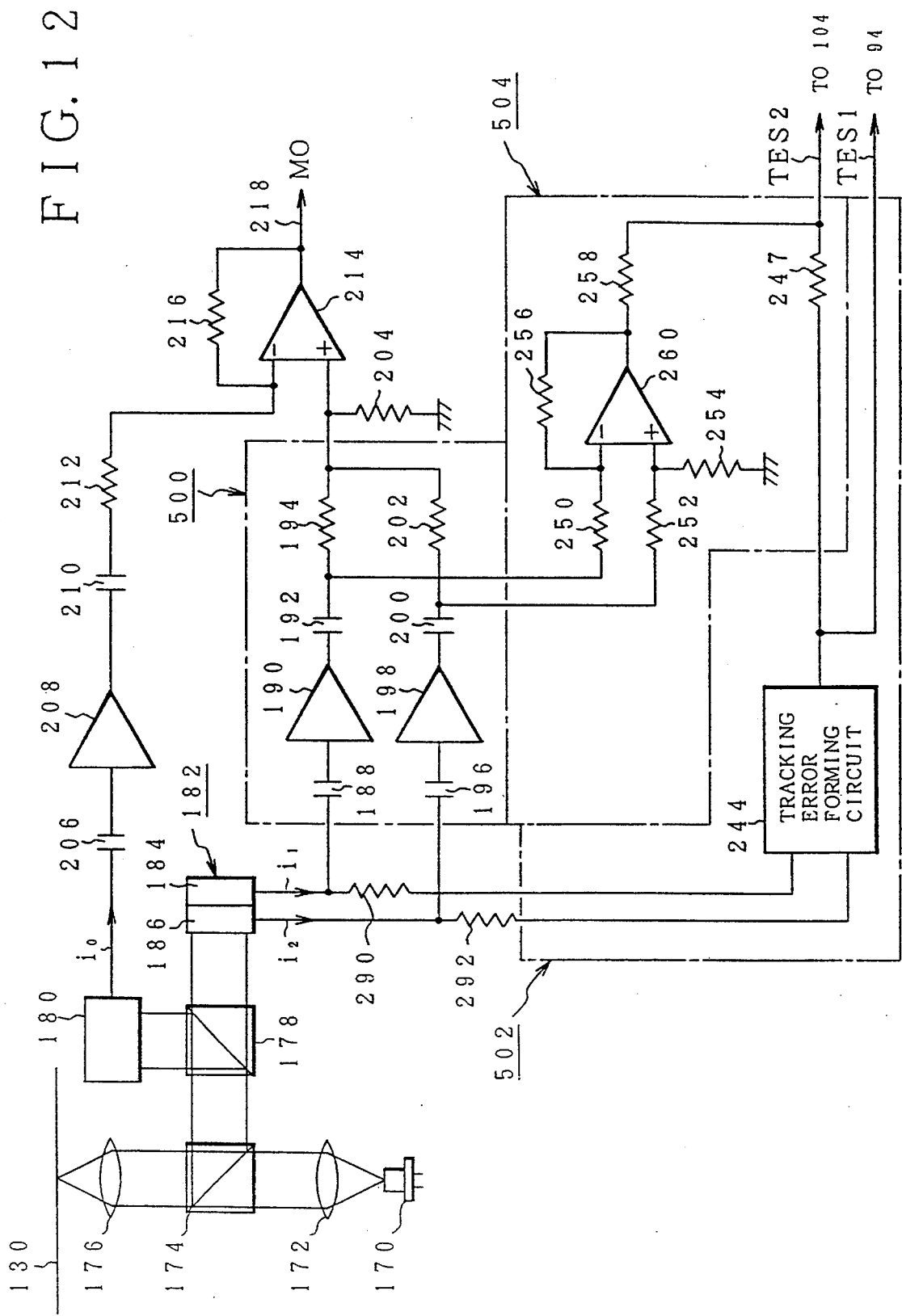
FIG. 12 is a block diagram of another embodiment of the invention.

FIG. 12 shows the second embodiment as a modification of the embodiment of FIG. 10. In the second embodiment, the tracking error signal for track counting that is used in the seeking operation and the tracking error signal which is used at the time of the fine control are individually formed.

In FIG. 12, the first circuit section 500 for reproduction is the same as that shown in FIG. 10 and the method of forming the reproduction signal MO is also the same as that in FIG. 10. On the other hand, a circuit section for servo comprises: the second circuit section 502 having the tracking error forming circuit 244; and a third circuit section 504 newly provided. The tracking error forming circuit 244 in the second circuit section 502 is fundamentally the same as that in the embodiment of FIG. 10 and forms a tracking error signal TES1 as a difference $(i_1-i_2)$ between the detection currents $i_1$ and $i_2$ from the 2-split photodetector 182. The frequency band of the tracking error signal TES1 lies within a range from DC to 500 kHz or higher, for example, DC to 1 MHz.

Further, in the second embodiment, the light emission powers of the laser diode in the writing mode, erasing mode, and reading mode differ. The return lights which are received by the 2-split photodetector 182 also differ depending on the different light emission powers. Therefore, in order to always obtain the constant tracking error signal for a fluctuation in light reception power, a normalizing function is provided for the tracking error forming circuit 244. The normalizing function of the tracking error forming circuit 244 functions so as to provide the signal obtained by dividing the tracking error signal TES1 $=(i_1-i_2)$ that is derived as a difference between the detection currents $i_1$ and $i_2$ from the 2-split photodetector 182 by the sum $(i_1+i_2)$ of the two detection currents $i_1$ and $i_2$. That is, $$TES1=(i_1-i_2)/(i_1+i_2)$$

The normalized tracking error signal TES1 that is output from the tracking error forming circuit 244 of the second circuit section 502 is solely used in only the fine control after completion of the seeking operation. Therefore, the signal TES1 is supplied to the phase compensating circuit 94 shown in FIG. 7.

The third circuit section 504 to form a second tracking error signal TES2 will now be described. An operational amplifier 260 which functions as a differential amplifier is provided for the third circuit section 504. The voltage signals proportional to the detection currents $i_1$ and $i_2$ derived from the operational amplifiers 190 and 198 of the first circuit section 500 are supplied to the operational amplifier 260, by which a difference between them is obtained and the tracking error signal TES2 is formed. Since the frequency characteristics of the first circuit section 500 lie within a range, for example, from 100 kHz to 20 MHz, the tracking error signal TES2 has the same frequency band of 10 kHz to 20 MHz. The second tracking error signal TES2 from the operational amplifier 260 is added through a resistor 247 to the tracking error signal TES1 on the low frequency side generated from the tracking error forming circuit 244. Finally, it is generated as a tracking error signal TES2 having the frequency band characteristics 248 of DC to 500 kHz shown in FIG. 11C. Since the tracking error signal TES2 is used for track counting in the seek control, it is supplied to the zero-cross comparator 104 in FIG. 7. The zero-cross comparator 104 slices the tracking error signal TES2 by an almost central voltage, thereby converting into the binarized track crossing pulse. The number of tracks is counted by the track counter 106. Since the tracking error signal TES2 of a wide band from the second circuit section 504 is excessively extended to the high frequency, by transmitting the signal TES2 through a low pass filter whose cut-off frequency is set to, for example, 500 kHz, it can be also supplied to the zero-cross comparator 104 as a tracking error signal having the frequency band characteristics 250 of DC to 500 kHz shown in FIG. 11D as necessary.

Figure 13:
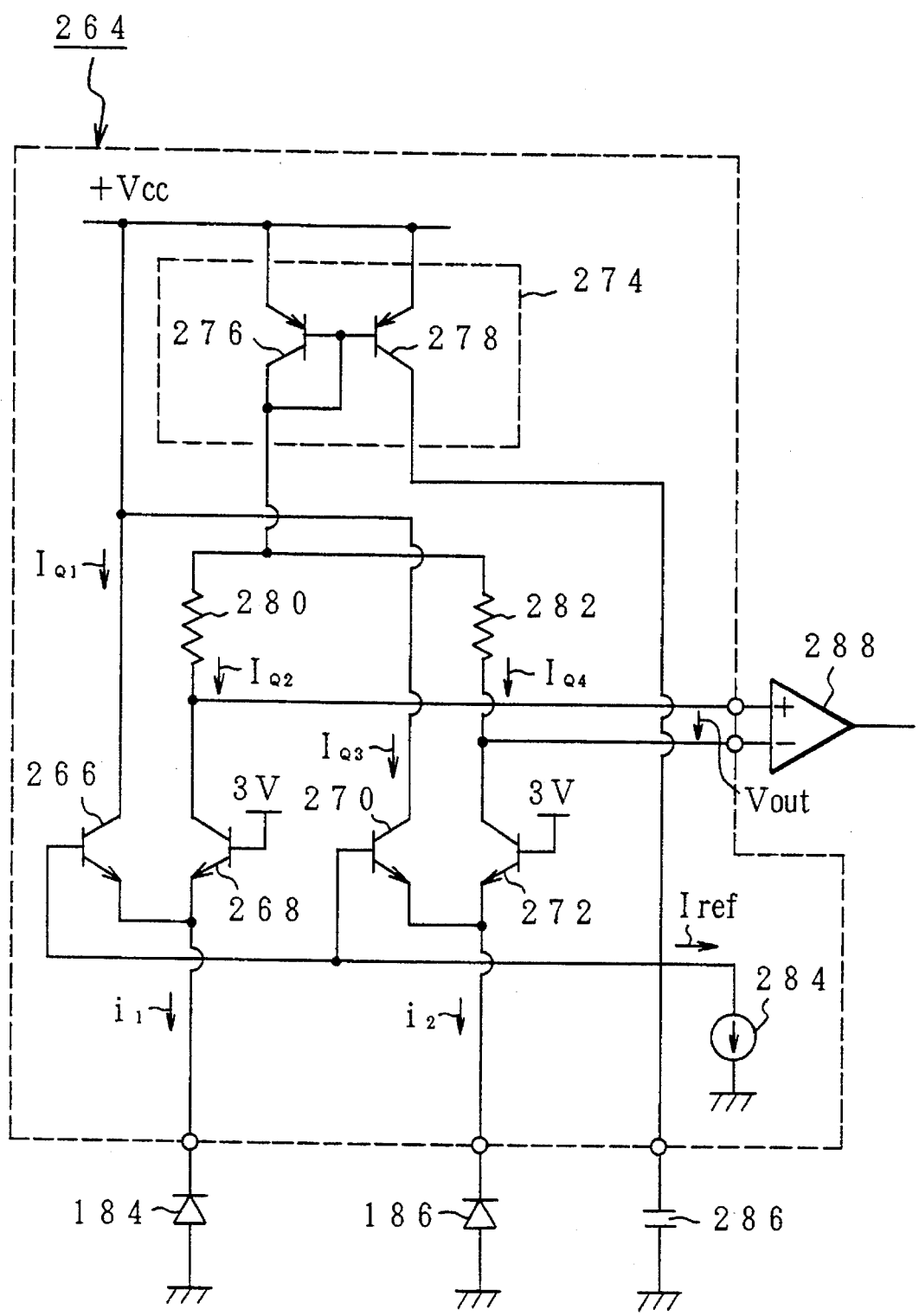
FIG. 13 is a block diagram of an embodiment of a tracking error forming circuit in FIG. 12 having a normalizing function.

FIG. 13 shows an embodiment of the tracking error forming circuit 244 provided in the second circuit section 502 in FIG. 12. In case of realizing the tracking error forming circuit 244 having the normalizing function in FIG. 12 by using an operational amplifier, a resistor, and the like, a circuit construction becomes complicated and it is difficult to distribute the level and to decide the operating point. Further, a single power source cannot be used and it is hard to form an IC.

In the embodiment of FIG. 13, a tracking error forming circuit which can be easily formed as an IC and operates by a single power source and realizes a miniaturization and low costs is provided. In FIG. 13, two sets of a pair of transistors 266 and 268 and a pair of transistors 270 and 272 whose emitters are commonly connected are provided in an IC circuit section 264. The light receiving sections 184 and 186 of the 2-split photodetector 182 are externally connected to the common emitters and the light reception currents $i_1$ and $i_2$ are supplied. A DC bias voltage of, for example, 3V is applied to bases of the transistors 268 and 272. Collectors of the transistors 268 and 272 are commonly connected through resistors 280 and 282 and are further connected to a power source +Vcc through a transistor 276 of a current mirror circuit 274. A transistor 278 whose base is commonly connected to a base of the transistor 276 is provided for the current mirror circuit 274. A collector of the transistor 278 is connected to a capacitor 286 which is externally connected. The transistor 278 of the current mirror circuit 274 converts a difference between a mirror current and a reference current Iref by a constant current source 284 connected in parallel with the capacitor 286 side into a voltage signal by the capacitor 286. The voltage signal is supplied to the transistors 266 and 270 whose bases are commonly connected. Collectors of the transistors 266 and 270 are commonly connected and are directly connected to the power source +Vcc. An integration capacity of the capacitor 286 has a phase compensating function of a feedback loop and prevents the oscillation. Further, an operational amplifier 288 to obtain a difference of the collector potential of the transistor 268 is externally provided. The normalized tracking error signal TES1 is output from the operational amplifier 288.

The operation of the circuit of FIG. 13 will now be described. The relation between a voltage $V_{BE}$ between the base and emitter of the transistor and a collector current Ic is generally shown by the following equation.

$$Ic = Is \, [\exp\{q/(kT) \times V_{BE}\} - 1] \tag{1}$$

where, q: charge of an electron

T: absolute temperature k: Boltzmann's constant

Is: collector reverse direction saturation current

At an ordinary temperature (300° K.), the term of the exponential function of the equation (1) is equal to 47.7 when $V_{BE}=0.1V$, to 227.4 when $V_{BE}=0.2V$, and to $1.17 \times 10^{10}$ when $V_{BE}=0.6V$. Therefore, it is possible to regard that $$\exp\{q/(kT) \times V_{BE}\} \gg 1$$

The equation (1) becomes the following equation (2).

$$Ic = Is \, [\exp\{q/(kT) \times V_{BE}\}] \tag{2}$$

By applying the circuit of FIG. 13, collector currents IQ1 to IQ4 of the transistors 266, 268, 270, and 272 are expressed by the following equations (3).

$$IQ1 = Is[\exp\{q/(kT) \times V_{BE}1\}]$$

$$IQ2 = Is[\exp\{q/(kT) \times V_{BE}2\}]$$

$$IQ3 = Is[\exp\{q/(kT) \times V_{BE}3\}]$$

$$IQ4 = Is[\exp\{q/(kT) \times V_{BE}4\}] \tag{3}$$

A ratio of the collector currents of the transistors 266 and 268 whose emitters are commonly connected is obtained by the following equation (4).

$$IQ1/IQ2 = \exp\,[q/(kT) \times (V_{BE}1 - V_{BE}2)] \tag{4}$$

Similarly, a ratio of the collector currents of the transistors 270 and 272 whose emitters are commonly connected is obtained by the following equation (5).

$$IQ3/IQ4 = \exp\,[q/(kT) \times (V_{BE}3 - V_{BE}4)] \tag{5}$$

Since, $$V_{BE}1 - V_{BE}2 = V_{BE}3 - V_{BE}4$$

the equations (4) and (5) are equal and the following equation (6) is satisfied.

$$IQ1/IQ2 = IQ3/IQ4 = \alpha \tag{6}$$

In a feedback loop, a feedback is performed so that

IQ2+IQ4=Iref

Now, assuming that

IQ1+IQ2=$i_1$

IQ3+IQ4=$i_2$ $(i_1 - i_2)/(i_1 + i_2)$ to be obtained is expressed by the following equation (7).

$$\frac{(i_1 - i_2)}{(i_1 + i_2)} = \frac{IQ1 + IQ2 - (IQ3 + IQ4)}{IQ1 + IQ2 + IQ3 + IQ4} \tag{7}$$

By eliminating IQ1 and IQ3 by the equation (6), the following equation (8) is obtained.

$$\frac{(i_1 - i_2)}{(i_1 + i_2)} = \frac{IQ(\alpha+1) - IQ4(\alpha+1)}{IQ(\alpha+1) + IQ4(\alpha+1)} \quad (8)$$

$$= \frac{IQ2 - IQ4}{IQ2 + IQ4}$$

$$= \frac{IQ2 - IQ4}{Iref}$$

Now, assuming that the resistance values of the resistors 280 and 282 are equal and are set to R, a collector potential difference Vout of the transistors 268 and 272 is obtained by the following equation (9).

$$Vout = R \times Iref \times (i_1 - i_2)/(i_1 + i_2) \quad (9)$$

Therefore, the AGC is performed in the current mode and the tracking error signal TES1 as a difference between the two light receiving sections 184 and 186 can be formed.

By the circuit construction shown in FIG. 13, the apparatus which is strong against noises and in which a circuit construction is simple and the number of transistors is small can be realized. On the other hand, since the apparatus can be driven by a single power source and there is no need to use any operational amplifier, the circuit of the portion surrounded by a broken line can be cheaply realized as a small IC circuit 264. The capacitor 286 externally attached is used for phase compensation of the feedback loop and the oscillation is prevented by the capacitor 286.

According to the invention as mentioned above, the wide band of the tracking error signal can be realized by a general operational amplifier by separately amplifying the signal with respect to the low frequency and high frequency and adding the amplified signals after that without changing the optical system. An increase in costs due to the realization of the wide band can be remarkably reduced.

The present invention is not limited by the specific numerical values shown in the above embodiments.

What is claimed is:

1. An optical disk apparatus comprising:

a reading optical unit for irradiating a reading beam onto an optical disk medium and for extracting a return light reflected and diffracted by a track portion of said medium;

a photodetector having at least two-split light receiving sections, each for converting the return light extracted by said reading optical unit into a detection signal;

a first circuit for AC coupling each of said detection signals from said two light receiving sections provided for said photodetector and separating a band on a high frequency side, for individually amplifying said detection signals in a frequency band in a range from a predetermined first cut-off frequency to a predetermined ultra high frequency, for adding the amplified signals after that, and for forming a high frequency signal that is used for demodulation of read data; and a second circuit for DC coupling each of the detection signals from said two light receiving sections provided for said photodetector, for individually amplifying said detection signals in a frequency band in a range from DC to said first cut-off frequency, for adding the detection signals individually amplified by said first circuit after that, for producing two addition signals each having a frequency band in a range from a DC component to an ultra high cut-off frequency higher than said first cut-off frequency, for performing a subtraction between said two addition signals, and for forming a tracking error signal.

2. An apparatus according to claim 1, wherein said reading optical unit has at least:

a beam splitter for separating the return light of said optical disk medium which passes along the same path as that of a laser beam emitted from a laser light source; and a polarization beam splitter for transmitting a (P) polarization component of the return light separated by said beam splitter and for reflecting an (S) polarization component in the direction of 45° or more, thereby separating, and wherein a transmission light of said polarization beam splitter is allowed to enter said photodetector.

3. An apparatus according to claim 1, wherein said first cut-off frequency of said first circuit is equal to or higher than 10 kHz.

4. An apparatus according to claim 1, wherein said first circuit has a current/voltage converting circuit for converting each detection current that is output from said photodetector into a voltage signal.

5. An apparatus according to claim 1, wherein said second cut-off frequency of said second circuit is equal to or lower than 500 kHz.

6. An apparatus according to claim 1, wherein said second circuit has a current/voltage converting circuit for converting each detection current that is output from said photodetector into a voltage signal.

7. An apparatus according to claim 1, wherein said second circuit has an adding circuit for converting each detection current that is output from said photodetector into a voltage signal and, thereafter, for adding each detection signal converted into the voltage signal by said first circuit.

8. An apparatus according to claim 7, wherein an addition gain of said adding circuit is equal to almost 1.

9. An apparatus according to claim 1, further comprising:

a binarizing circuit for slicing the tracking error signal generated from said second circuit by almost a central voltage of said tracking error signal, thereby binarizing; and a track counter circuit for counting a binary signal from said binarizing circuit at the time of a seeking operation.

10. An optical disk apparatus comprising:

a reading optical unit for irradiating a reading beam onto an optical disk medium and for extracting a return light reflected and diffracted by a track portion of said medium;

a photodetector having at least two-split light receiving sections, each for converting the return light of said reading optical unit into a detection signal;

a first circuit for AC coupling each of said detection signals from said two light receiving sections provided for said photodetector and also separating a band on a high frequency side, for individually amplifying said detection signals in a frequency band in a range from a predetermined first cut-off frequency to a predetermined ultra high frequency, for adding the amplified signals after that, and for forming a high frequency signal that is used for demodulation of read data;

a second circuit for DC coupling each of the detection signals from said two light receiving sections provided for said photodetector, for individually amplifying said detection signals in a frequency band in a range from DC to a second ultra high cut-off frequency higher than said first cut-off frequency, for performing a subtraction between said two detection signals after that, and for forming a first tracking error signal; and a third circuit for forming a differential signal from said two detection signals derived by the amplification of said first circuit, for adding said first tracking error signal from said second circuit to said differential signal after that, and for forming a second tracking error signal.

11. An apparatus according to claim 10, wherein said first tracking error signal that is output from said second circuit is used only for an on-track control for allowing the light beam to trace a target track.

12. An apparatus according to claim 10, wherein said second tracking error signal that is output from said third circuit is used only for track counting at the time of a seeking operation.

13. An apparatus according to claim 10, further comprising:

a binarizing circuit for slicing said second tracking error signal generated from said third circuit by an almost central voltage of said second tracking error signal, thereby binarizing; and a track counter circuit for counting a binary signal from said binarizing circuit at the time of a seeking operation.

14. An apparatus according to claim 10, wherein said second circuit has a normalizing circuit for dividing a difference between said two detection signals of said photodetector by the sum of said two detection signals and for outputting a normalized tracking error signal.

15. An apparatus according to claim 14, wherein said normalizing circuit has a dividing circuit in which two sets of transistor pairs whose emitters are commonly connected are provided, a specified DC bias voltage is applied to a base of one transistor of each of said transistor pairs, collectors are commonly connected through resistors and are connected to a power source, and a base of the other transistor of each of said transistor pairs is commonly connected, and a difference between a current that is equal to a current of said portion having a common connection and a reference current is integrated by a capacitor and is applied to the base of the other transistor commonly connected, said pair of light receiving sections are connected to each of said common emitters of each of said transistor pairs so that the detection current of said pair of light receiving sections of said photodetector flows, and the first tracking error signal is obtained from a difference of a collector potential of said each one transistor.

16. An apparatus according to claim 10, wherein said reading optical unit comprises at least:

a beam splitter for separating a return light of said optical disk medium which passes along the same path as that of a laser beam emitted from a laser light source; and a polarization beam splitter for transmitting a (P) polarization component of said return light separated by said beam splitter and for reflecting an (S) polarization component in the direction of 45° or more, thereby separating, and wherein a transmission light of said polarization beam splitter is allowed to enter said photodetector.

17. An apparatus according to claim 10, wherein said first cut-off frequency of said first circuit is equal to or higher than 10 kHz.

18. An apparatus according to claim 10, wherein said first circuit has a current/voltage converting circuit for converting each detection current generated from said photodetector into a voltage signal.

19. An apparatus according to claim 10, wherein the second cut-off frequency of said second circuit is equal to or lower than 500 kHz.

20. An apparatus according to claim 10, wherein said second circuit has a current/voltage converting circuit for converting each detection current generated from said photodetector into a voltage signal.

21. An apparatus according to claim 10, wherein said second circuit has an adding circuit for converting each detection current generated from said photodetector into a voltage signal and, thereafter, for adding each detection signal converted into the voltage signal by said first circuit.

22. An apparatus according to claim 21, wherein an addition gain of said adding circuit is equal to almost 1.

* * * * *